United States Patent

McKee et al.

[11] Patent Number: 5,434,390
[45] Date of Patent: Jul. 18, 1995

[54] QUICK-COOKIG OVEN

[75] Inventors: Philip R. McKee, Wichita, Kans.;
Earl R. Winkelmann, Garland, Tex.

[73] Assignee: TurboChef, Inc., Wichita, Kans.

[21] Appl. No.: 128,897

[22] Filed: Sep. 29, 1993

Related U.S. Application Data

[63] Continuation-in-part of Ser. No. 761,285, Sep. 17, 1991, Pat. No. 5,254,823.

[51] Int. Cl.6 .............................................. H05B 6/64
[52] U.S. Cl. .................................... 219/681; 219/400; 219/678; 219/680; 126/21 A; 99/475; 221/150 A; 426/466
[58] Field of Search ............... 219/678, 680, 681, 686, 219/390, 400, 401; 126/21 A, 21 R; 221/150 A, 150 R; 426/466, 243; 99/475, 477

[56] References Cited

U.S. PATENT DOCUMENTS

| | | | |
|---|---|---|---|
| 4,154,861 | 5/1979 | Smith | 426/466 |
| 4,841,125 | 6/1989 | Edamura | 219/506 |
| 4,951,645 | 8/1990 | Luebke et al. | 126/20.1 |
| 5,147,994 | 9/1992 | Smith et al. | 219/680 |
| 5,254,823 | 10/1993 | McKee et al. | 219/680 |

Primary Examiner—Bruce A. Reynolds
Assistant Examiner—Tu Hoang
Attorney, Agent, or Firm—Amster, Rothstein & Ebenstein

[57] ABSTRACT

An oven for cooking by hot air impingement includes a housing defining a cooking chamber adapted to receive a food product for cooking, a hot air plenum configured and dimensioned to hold a volume of air and a conduit for providing gaseous communication therebetween. Associated with the plenum is a thermal energy source for heating gas disposed in the plenum.

41 Claims, 8 Drawing Sheets

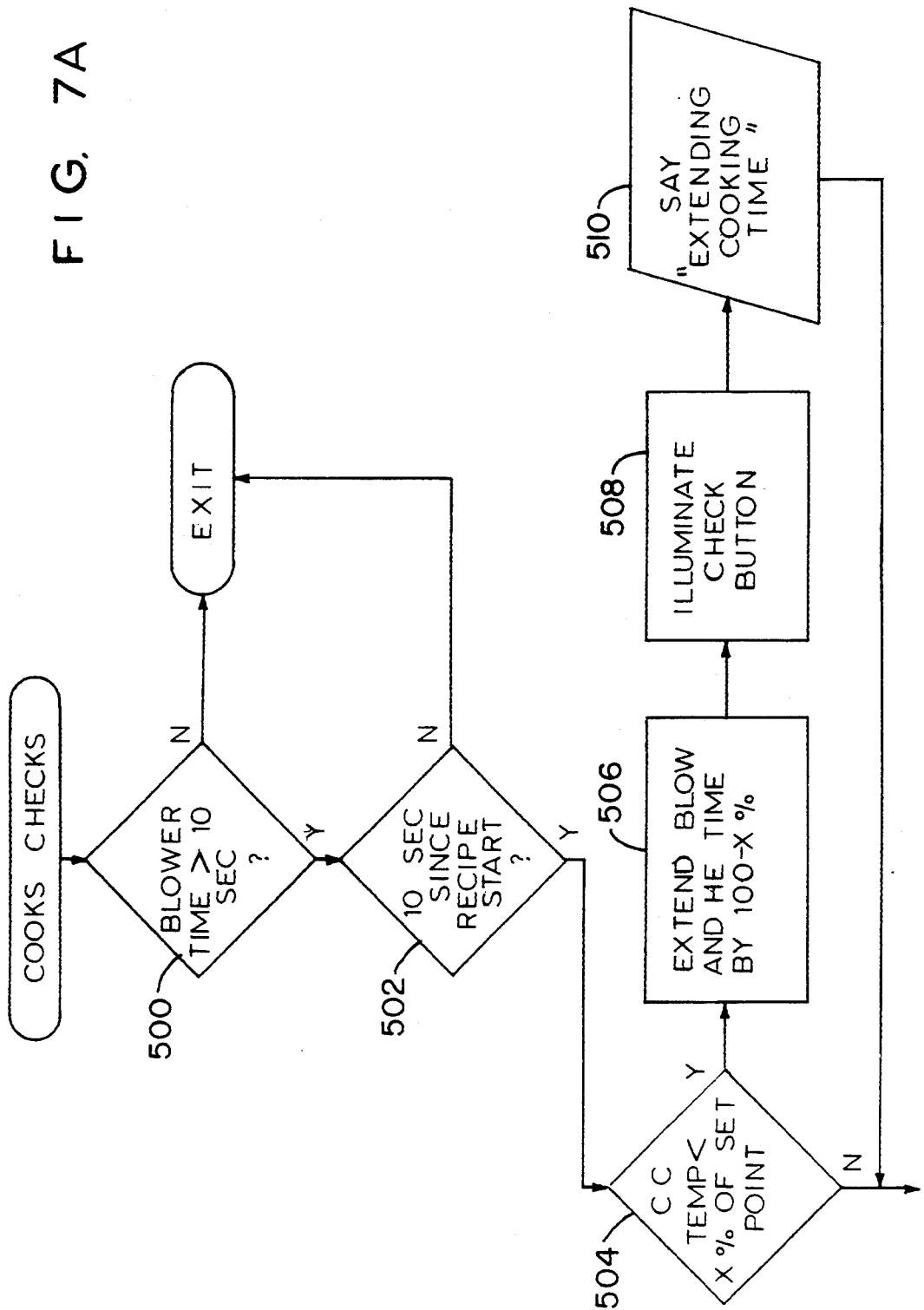

QUICK-COOKIG OVEN

CROSS-REFERENCE TO RELATED APPLICATION

This is a continuation-in-part of U.S. patent application Ser. No. 07/761,285, filed Sep. 17, 1991, now U.S. Pat. No. 5,254,823.

BACKGROUND OF THE INVENTION

The present invention relates to a hybrid oven for cooking by hot air impingement and microwave cooking and a non-hybrid oven for cooking by hot air impingement, and more particularly to such an oven which is capable of rapidly cooking food products.

The "fast food" industry operates under the premise that, due to the anticipated sales volume during peak hours, food can be prepared before an order is placed therefor. As a result, the food is usually delivered to the customer within 30 seconds of the order because the food was already prepared, typically within the last five minutes so that its quality is not degraded. However, this results in substantial inventory loss if customer traffic is less than anticipated, as well as substantial delays if customer traffic is more than anticipated, especially during off-peak hours.

A similar problem exists within food service venues other than typical "fast food" restaurants. For example, prepared food sold in grocery stores and convenience stores is typically prepared several hours before the food is purchased by the consumer. Not only does this result in substantial inventory loss if traffic is less than expected, but the food itself is often of lower quality than what might be available from a restaurant because it has been prepared well in advance of sale to the consumer and held in anticipation of sale. This reduced quality, as well as the perception of reduced quality in the minds of consumers, results in lower sales than would occur if the food quality was in line with what is cooked and immediately (or almost immediately) sold at restaurants.

Attempts to deliver "cooked to order" food of high quality within an acceptable time frame have not been entirely successful. Indeed, it is precisely this shortcoming which has prevented the creation of acceptable hot food vending machines (similar in size and concept to the well known soft-drink vending machines) which could turn out national fast food chain quality food from a fully automated machine.

A satisfactory quick-cooking oven must be able to heat or cook—from frozen, refrigerated or ambient temperature states—food products, whether they are already prepared (e.g., frozen fried chicken nuggets), partially prepared (e.g., frozen "par-baked" pizza) or raw (e.g., biscuits, fish), with the process generally being completed within times that the fast food customer has become accustomed to waiting (generally less than 30–50 seconds for most food products). It will be readily appreciated that an oven which can complete the process in 30 seconds can enable food to be sold at twice the rate during peak hours than a machine which requires a minute, whether the oven is disposed in a fast food restaurant, in a ancillary food service location such as in a convenience store, or as part of an automatic vending machine. Additionally, there is a threshold to the amount of time most consumers will wait for a food product to be delivered. Although there may be some debate as to what that threshold time limit is, it is clear that far fewer customers will knowingly wait for 90 seconds for delivery of their food than will wait for 30 seconds. This marginal customer group will also result in additional sales.

It will be appreciated that a quick-cooking oven also desirable for many food items because various characteristics which change during the cooking process (such as texture, flavor, odor and appearance) may be affected in different ways during the cooking process—by which is meant, faster cooking times may in certain instances provide a higher overall quality food product than slow cooking times.

Conventional microwave ovens can deliver large amounts of heat over short periods of time, but result in a "synthetic" product, without browning or crisping. While this may be acceptable for some products, such as popcorn, it is generally unacceptable for a wide variety of food products such as pizzas, fried chicken, toast, etc. Conventional air impingement ovens can rapidly cook food products by forcing heated air onto the food surface at high velocities, thus "driving" the heat into the food product. However, attempts to reduce cook times in conventional air impingement ovens are limited in their effectiveness by the food product degradation which occurs as the temperature and velocity of the air striking the food product are increased.

One of the biggest challenges in rapid cooking is to deliver by hot air a consistent supply of energy to the food product, particularly as it relates to successive cooks of identical food products. This is a cooking quality issue. When large amounts of heat enter and leave a system quickly, there is almost always a "sine wave" effect. That would not necessarily be completely bad if the point on the sine curve at which food begins and ends each cook cycle was precisely repeatable. But an important goal is to have each cook be identical to the last one. Even if the same average number of calories is delivered during each cook cycle (e.g., by starting at a low temperature and finishing at a high temperature on one cook, and vice versa on the next cook), two different products may be produced. Accordingly, the heat delivered to the food product must be predictable along a relatively flat line.

Conventional hybrid ovens, which combine both hot air impingement and microwave cooking techniques, can heat and cook more rapidly than either cooking method individually. However, the known hybrid ovens are either much too slow (for example, requiring a lengthy period of as much as five minutes to cook a frozen pizza) or, if they have sufficient energy input (such as 220 volts) and/or are provided with a substantial warm-up time (frequently 15 seconds or so), they can cook the same food product in a faster but still unacceptably slow period (for example, 180 seconds). The 180 second ovens typically use as heating elements heating coils similar to a hair dryer, which take several seconds to reach peak temperatures and then only heat up the air as it passes over the heating coils. Thus such ovens require a substantial warm-up time to heat the coils to peak temperatures and then additional time to heat up the air already in the oven by passing it over the coils. (It should be kept in mind that the initial batch of hot air leaving the heating coils is rapidly cooled as it mixes with the cold food product and the air already present in the cooking chamber.) While a fast food restaurant will generally have sufficient energy to operate a powerful hybrid oven (such as 220 volts), other locations which might benefit from rapid cooking (such as a typical vending machine location) may have only a 110 volt power supply available to them and thus cannot utilize one of the hybrid ovens which requires a 220 volt power supply. Because heating coils and magnetron(s) which could operate simultaneously on a 110 volt power supply would be of substantially reduced capacity as compared to heating coils and magnetron(s) which each require an essentially dedicated 110 volt power supply to operate efficiently, a larger power supply (e.g., 220 volts) would be required to deliver similar cooking energy in the known hybrid ovens.

Non-hybrid hot air impingement ovens are typically not used in applications which require immediate cooking and delivery to the consumer, since the impinging hot air has only a limited ability to cook the food interior, especially where the product is of substantial dimensions. Even so, the non-hybrid hot air impingement oven of conventional design is subject to many of the same disadvantages as the hybrid oven, and in particular requires several minutes in order to cook the food by hot air impingement alone. These ovens, like the 180 second ovens, require a warm-up time of several seconds in order to reach peak temperatures in the heating coils, and then still more time in order to heat up the air already in the system by passing it over the heating coils.

Certain steps have been taken to reduce cook times in conventional microwave, air impingement and hybrid ovens. For example, microwave energy can be increased as a means of imparting more microwave energy to a food product over a given period of time, thus increasing the temperature of the food product more rapidly during that period of time. However, this increased heat transfer due to increased microwave energy also increases the product degradation that occurs when microwaves are used to heat food products. Air velocities and temperatures in conventional air impingement ovens can also be increased as a means of reducing cook times. In general, increasing the velocities of columnated jets of heated air, as well as increasing the temperature of the air, result in increased heat transfer. However, at some point the benefits of more rapid heat transfer into the good product are offset by a reduction in the quality of the food product. In fact, most conventional air impingement ovens require some type of movement of the food product relative to the columnated jets of heated air which impinge upon the food surface, at least in part for the purpose of minimizing the degradation of the food directly beneath the columnated jets. As a result of these and other limitations, the fastest microwave, air impingement and hybrid ovens of conventional design all have difficulty cooking food products at a quality level in line with fast food restaurants.

Conventional microwave ovens have the ability to deliver varying amounts of microwave energy to food products within their cavities, and for various cook times depending on operator input. This feature allows conventional microwave ovens to be used to heat a variety of food products, one after another, and to adjust the amount of microwave energy delivered to a particular type of food product based on operator input. Accordingly, the operator may press the "potato" button when heating a potato, and the "soup" button when heating soup, and expect different amounts of microwave energy to be delivered to the food products based on these different operator inputs. However, particular difficulty has been encountered in consistently heating food products of the same type, but of varying sizes (such as 6 ounce versus 7 ounce potatoes), with microwave energy at a fixed setting. Conventional air impingement ovens have very little flexibility in both quantity and duration of heat transfer due to the fact that food typically travels through the cooking cavity on a support means (such as a conveyer) at a fixed rate. This not only makes it difficult to vary air velocity from one product to another, but also difficult to vary cook duration. Attempts to solve these problems by combining air impingement and microwaves in conventional non-conveyorized systems by varying air velocities and microwave energy under computer control, have not been entirely successful. Even the most advanced design of hybrid ovens of conventional design, with state of the art cooking controls, encounter particular difficulty in cooking a variety of products (such as chicken, pizza, egg rolls and french fried) one after the other, of the quality and at the speeds consumers demand and with any operational consistency.

Accordingly, it is an object of the present invention to provide a quick-cooking oven such as a hybrid oven generally capable of cooking most frozen foods of at least single entree portions within 30 to 80 seconds depending upon food product and volume.

It is another object to provide such a quick-cooking oven which is generally capable of cooking most refrigerated food products of at least single entree portions within 15 to 50 seconds, depending upon food product and volume.

Another object is to provide such an oven which in one embodiment utilizes both hot air impingement and microwave cooking.

It is also an object to provide such a quick-cooking oven which cooks food products which are generally at least of the quality of food served at fast food restaurants.

A further object is to provide such a quick-cooking oven which is generally capable of cooking a wide range of food products, one after another.

It is a further object of the present invention to provide in one embodiment a quick-cooking non-hybrid oven which cooks with hot air impingement only.

Another object is to provide such a quick-cooking non-hybrid oven which is generally capable of cooking most refrigerated food products of at least single entree portions within 20 to 60 seconds depending upon food product and volume.

It is also an object to provide such a quick-cooking non-hybrid oven which cooks food products which are generally of at least the quality of food served at fast food restaurants.

A further object is to provide such quick-cooking non-hybrid oven which is generally capable of cooking a wide range of good products, one after another.

Another object is to provide such an oven which cooks foods of the same type to a consistent quality throughout the day, regardless of the order in which various foods are cooked.

It is a further object to provide such an oven which is safe, simple and economical to manufacture, use and maintain.

SUMMARY OF THE INVENTION

It has now been found that the above and related objects are obtained in one or more of the embodiments of a quick-cooking oven according to the present invention.

The first embodiment is an oven for cooking a food product at least partially by hot gas flow, comprising a housing defining a cooking chamber adapted to receive a food product for cooking, a hot gas plenum configured and dimensioned to hold a volume of gas, and conduit means for providing gaseous communication therebetween. Associated with the cooking chamber are impingement-causing means for causing impingement of gas from the plenum onto the food product in the cooking chamber, and return means for causing return of at least some of the gas from the cooking chamber to the plenum. Associated with the plenum is a thermal energy source for heating gas disposed in the plenum. Blower means selectively and variably cause the flow of gas from the return means, through the plenum, and to the impingement-causing means. Control means are provided for variably actuating the blower means.

In preferred aspects of the first embodiment, the control means includes means for maintaining a substantially constant temperature of gas supplied from the plenum despite substantial periodic thermal transfers to gas passing through the plenum. The thermal energy source comprises a thermal reservoir and actuatable heating means for maintaining the thermal reservoir at a high temperature. The control means includes means for actuating heating means in response to at least one factor selected from the group consisting of a drop in the temperature of the thermal reservoir, a drop in the temperature of the cooking chamber, a calculated thermal loss from the oven, and combinations thereof. The control means also includes means for calculating the thermal loss from the oven over a period of time from various factors including at least one factor selected from the group consisting of the thermal energy lost from the cooking chamber to ambient gas, the thermal energy lost from the cooking chamber to a food product cooked in the cooking chamber, the thermal energy generated by the thermal energy source, and combinations thereof. The control means actuates the blower at least periodically to maintain the cooking chamber at at least a predetermined minimum temperature between cooking cycles. The control means further includes means for blowing gas from the plenum through the impingement-causing means at a predetermined rate appropriate to the particular food product for cooking during an initial portion of the cooking cycle, and thereafter adjusting the gas flow rate to provide at various points in the cooking cycle respective appropriate temperature differentials between the temperature of the plenum and the temperature of the cooking chamber.

Preferably, the impingement-causing means causes impingement of gas from the plenum onto selected areas of a food product in the cooking chamber, and the return means enables the return of gas from the selected areas to the plenum only by passage of the gas in heat-transfer relationships over at least some of the nonselected areas of the food product. The blower means can selectively and variably provide the gaseous communication between the plenum and the cooking chamber in increments at least as low as 5% of the maximum flow rate. The temperature of the gas in the plenum is substantially constant, and the effective temperature of the gas seen by the food product in the cooking chamber varies depending on the speed of the gas impinging on the food product. The return means is disposed relative to the food product such that the gas undergoes generally horizontal flow underneath the food product. The return means includes a filter box disposed intermediate the food product and the plenum, the filter box having a portion of enlarged cross section and a bottom surface therebelow cooler than the gas entering the box, whereby the gas is slowed and cooled to convert gas-borne grease into liquid form, the grease in liquid form being trapped by the filter box bottom surface.

Where the oven can cook food product at least partially by microwave cooking, the oven additionally including means for generating microwave energy and directing the microwave energy to the food product in the cooking chamber, the gas from the plenum being discharged in a given direction from the impingement-causing means and the microwave energy from the microwave generating and directing means preferably being transmitted in an opposite direction.

The second embodiment is an oven for cooking a food product at least partially by hot gas flow, comprising a housing defining a cooking chamber adapted to receive a food product for cooking, a hot gas plenum configured and dimensioned to hold a volume of gas, and conduit means for providing gaseous communication therebetween. Associated with the cooking chamber are impingement-causing means for causing impingement of gas from the plenum onto the food product in the cooking chamber, and return means for causing return of at least some of the gas from the cooking chamber to the plenum. Associated with the plenum are a thermal reservoir and actuatable heating means for maintaining the thermal reservoir at a high temperature. Blower means cause the flow of gas from the return means, through the plenum, and to the impingement-causing means. Control means are provided for independently actuating the heating means and the blower means, the control means including means for maintaining a substantially constant temperature of gas supplied from the plenum despite substantial periodic thermal transfers to gas passing through the plenum.

In preferred aspects of the second embodiment, the thermal reservoir defines a large thermal mass of metal and a closed volume for maintaining the mass of metal therein, whether the metal is in any of the solid phase, liquid phase, and combinations thereof. The actuatable heating means heats the thermal mass, and the control means additionally including means for actuating the heating means to maintain at least a substantial proportion of the thermal mass in the liquid phase. The metal is preferably selected from the group consisting of zinc and zinc alloys. The large thermal mass of metal has a potential total heat of fusion which is at least sufficient to cook a given food product in the cooking chamber, and preferably to cook successively a plurality of food products in the cooking chamber. The control means includes means for actuating the heating means in response to at least one factor selected from the group consisting of a drop in the temperature of the thermal mass, a drop in the temperature of the top surface of the food product in the cooking chamber, a calculated thermal loss from the oven, and combinations thereof.

The third embodiment is an oven for cooking a food product at least partially by hot gas flow, comprising a housing defining a cooking chamber adapted to receive a food product for cooking, a hot gas plenum configured and dimensioned to hold a volume of gas, and conduit means for providing gaseous communication therebetween. Associated with the cooking chamber are impingement-causing means for causing impingement of gas from the plenum onto the food product in the cooking chamber, and return means for causing return of at least some of the gas from the cooking chamber to the plenum. Associated with the plenum are a thermal reservoir and actuatable heating means for maintaining the thermal reservoir at a high temperature. Blower means cause the flow of gas from the return means, through the plenum, and to the impingement-causing means. Control means are provided for independently actuating the heating means and the blower means. The control means includes means for actuating the heating means in response to at least one factor elected from the group consisting of a drop in the temperature of the thermal reservoir, a drop in the temperature of the top surface of the food product in the cooking chamber, a calculated thermal loss from the oven, and combinations thereof.

In preferred aspects of the third embodiment, the control means includes means for calculating the thermal loss from the oven over a period of time from various factors including at least one of the thermal energy lost from the cooking chamber to ambient gas, the thermal energy lost from the cooking chamber to a food product cooked in the cooking chamber, the thermal energy generated by the heating means, and combinations thereof. The control means periodically actuates the blower to maintain the cooking chamber at at least a predetermined minimum temperature between cooking cycles.

A fourth embodiment is an oven for cooking a food product at least partially by hot gas flow, comprising a housing defining a cooking chamber adapted to receive a food product for cooking, a hot gas plenum configured and dimensioned to hold a volume of gas, and conduit means for providing gaseous communication therebetween. Associated with the cooking chamber are impingement-causing means for causing impingement of gas from the plenum onto the food product in the cooking chamber, and return means for causing return of at leas some of the gas from the cooking chamber to the plenum. Associated with the plenum is a thermal energy source for heating gas disposed in the plenum. Blower means selectively and variably cause the flow of gas from the return means, through the plenum, and to the impingement-causing means. Control means are provided for variably actuating the blower means. The control means includes means for causing the blower means to blow gas from the plenum through the impingement-causing means at a predetermined flow rate appropriate to the particular food product for cooking during an initial portion of the cooking cycle, and thereafter adjusting the gas flow rate to provide at various points in the cooking cycle appropriate temperature differentials between the temperature of the plenum and the temperature of the top surface of the particular food product in the cooking chamber for the particular food product.

In preferred aspects of the fourth embodiment, the control means includes a memory means for storing, for different types of food product, the appropriate temperature differentials between the plenum temperature and the temperature at the top surface of a food product of that type in the cooking chamber at various points in a cooking cycle. Alternatively, or in addition thereto, the control means includes a memory means for storing, for different types of food product, the appropriate temperature at the top surface of a food product of that type in the cooking chamber at various points in a cooking cycle. The control means additionally includes means for adjusting the duration of the cooking cycle, for example, depending upon the temperature at the top surface of a particular food product in the cooking chamber.

The fifth embodiment is an oven for cooking a food product at least partially by hot gas flow and at least partially by microwave cooking, comprising a housing defining a cooking chamber adapted to receive a food product for cooking, a hot gas plenum configured and dimensioned to hold a volume of gas, conduit means for providing gaseous communication therebetween, and means for generating microwave energy and directing the microwave energy to the food product in the cooking chamber. Associated with the cooking chamber are impingement-causing means for causing impingement of gas from the plenum onto the food product in the cooking chamber, and return means for causing return of at least some of the gas from the cooking chamber to the plenum. Associated with the plenum is a thermal energy source for heating gas disposed in the plenum. Blower means cause the flow of gas from the return means, through the plenum, and to the impingement-causing means. Control means are provided for independently actuating the thermal energy source, the microwave generating means, and the blower means. The gas from the plenum is discharged in a given direction from the impingement-causing means, and the microwave energy from the microwave generating and directing means is preferably discharged in the opposite direction.

Preferably the impingement-causing means is disposed above the food product and causes downward impingement of gas from the plenum onto the food product in the cooking chamber, and the microwave generating and directing means is disposed below the food product and causes the microwave energy to be upwardly directed onto the food product in the cooking chamber.

The sixth embodiment is an oven for cooking a food product at least partially by hot gas flow, comprising a housing defining a cooking chamber adapted to receive a food product for cooking, a hot gas plenum configured and dimensioned to hold a volume of gas, and conduit means for providing gaseous communication therebetween. Associated with the cooking chamber are impingement-causing means for causing impingement of gas from the plenum onto the food product in the cooking chamber, and return means for causing return of at least some of the gas from the cooking chamber to the plenum. Associated with the plenum is a thermal energy source for heating gas disposed in the plenum. Blower means cause the flow of gas from the return means, through the plenum, and to the impingement-causing means. Control means are provided for actuating the blower means. The return means includes a filter box disposed intermediate the food product and the plenum, the filter box having a cross section greater than the upstream portion of the return means and a bottom surface cooler than the gas entering the filter box, whereby the gas is slowed and cooled to convert gas-borne grease into liquid form, the grease in liquid form being trapped by the filter box bottom surface.

Preferably a grease filter is disposed intermediate the filter box bottom surface and the plenum, whereby any remaining gas-borne grease as well as other gas-borne particulates in the gas is removed by the filter.

The seventh embodiment is an oven for cooking a food product at least partially by hot gas flow, comprising a housing defining a cooking chamber adapted to receive a food product for cooking and maintain the food product stationary during cooking, a hot gas plenum configured and dimensioned to hold a volume of gas, and conduit means for providing gaseous communication therebetween. Associated with the cooking chamber are impingement-causing means for causing impingement of gas from the plenum onto selected areas of the food product in the cooking chamber, the impingement-causing means optionally being stationary relative to the food product during cooking, and return means for causing return of at least some of the gas from the cooking chamber to the plenum. The return means enables the return of gas from the selected areas to the plenum only by passage of the gas over and in heat-transfer relationship with at least some of the non-selected areas of the food product. Associated with the plenum is a thermal energy source for heating gas disposed in the plenum. Blower means cause the flow of gas from the return means, through the plenum, and to the impingement-causing means. Preferably the food product and the Impingement-causing means are stationary, with the impingement-causing means causing impingement of gas from the plenum onto fixed selected areas of the food product.

In preferred aspects of the seventh embodiment, both the selected areas and the non-selected areas are disposed on the top surface of the food product. The gas as a whole passes over and in heat-transfer relationship with all of the top surface of the food product. The return means enables the return of gas from the selected areas and the non-selected areas only by passage of the gas across and in heat-transfer relationship with a substantial portion of the bottom surface of the food product, preferably substantially a radius thereof. The return means is disposed relative to the food product such that the gas undergoes generally horizontal flow underneath the food product. The return means defines a central aperture therethrough and enables the return of gas from the cooking chamber to the plenum only via the central aperture. The oven return means also defines means for spacing the food product thereabove and enables the return of gas from said cooking chamber to said plenum via said spacing. The central aperture and/or the spacing typically limits the flow rate of gas through the cooking chamber.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIGS. 7A and 7B are together a flow chart of the cook checks sequence.

DETAILED DESCRIPTION OF THE PREFERRED EMBODIMENTS

Figure 1:
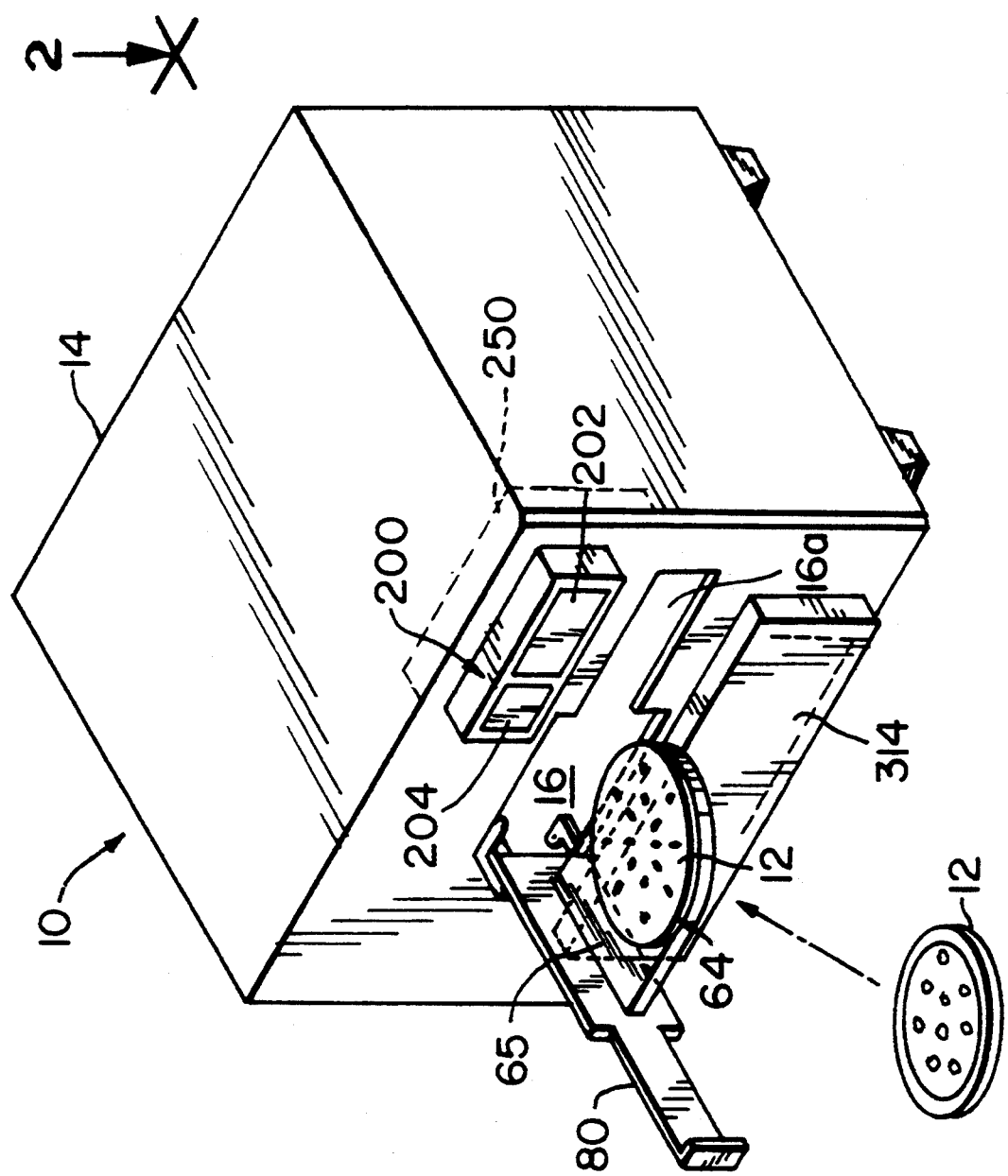
FIG. 1 is an isometric view of an oven according to the present invention.

While the present invention will be described in terms of a stand-alone quick-cooking oven such as might be found in a self-service retail environment (such as a convenience store) or in a full service establishment (such as a restaurant or short order care), it will be obvious to those skilled in the vending machine art that an oven according to the present invention may easily be incorporated into a stand-alone vending machine, similar to a soft drink or cigarette vending machine, wherein the user selects and pays for a particular food item which is then dispensed in a conventional manner from a supply of such food items into the cooking chamber, quickly cooked according to directions appropriate for the selected food item, and then discharged from the cooking chamber and delivered to the purchaser, all without human intervention and using automatic vending machine techniques well known to those skilled in the vending machine art.

Referring now to the drawing, and in particular to FIGS. 1-4 thereof, therein illustrated is a hybrid oven according to the present invention, generally designated by the reference numeral 10, for cooking a food product 12 (illustrated in FIG. 1 apart from the oven 10) by both hot air impingement and microwave cooking. The oven 10 essentially comprises a housing generally designated 14, a cooking cheer generally designated 16 and adapted to receive a food product 12 for cooking, a hot airplenum generally designated 18 and configured and dimensioned to hold a volume of air, and conduit means generally designated 20 for selectively providing gaseous communication between the cooking chamber 16 and the plenum 18. While the plenum 18 is illustrated as being positioned behind and above the cooking chamber 16, depending upon the desired configuration of the oven (which may be individualized to meet available space requirements), alternative dispositions of the plenum 18 relative to the cooking chamber 16 may be utilized. More particularly, the gaseous communication or conduit means 20 includes both an ingress conduit 22 for the passage of hot air from the plenum 18 into the cooking chamber 16 and an egress conduit 24 for the passage of cooled air from the cooking chamber 16 into the plenum 18. The hot air may also pass through filter means 300 and impeller means 40 to be discussed hereinafter.

The plenum 18 has associated therewith, and preferably disposed therein, a thermal energy source 25 for heating the air disposed in the plenum 18. As a conventional thermal energy source powered by a 110–120 volt power supply (as is commonly found in homes and other non-commercial establishments in the United States) cannot keep up with the demands placed on the plenum for a supply of hot air sufficient to cook a series of food products rapidly and consistently, it is necessary to employ a large thermal reservoir of a metal, such as steel or copper, disposed in the configuration of a heat exchanger, to absorb heat from a power source between cooks and to facilitate rapid heat transfer between the reservoir and the ambient air within the plenum during cooks. However, even when this supply of heat from the reservoir to the plenum continues during the brief period of cooking of a single food product, the temperature of the reservoir may drop appreciably as the 110 volt power supply is typically unable to produce an energy input equivalent to the energy output being used to cook the food product rapidly. Accordingly, the plenum is designed preferably to be at least equal in mass to, and preferably larger than, the cooking chamber. A large heat sink enables a relatively consistent cook from one cook to the next, but places an undesirable limit on the compactness of the oven. On the other hand, where a larger power supply (such as a 220 volt power supply) is available for the thermal energy source 25 heating the air in the plenum (whether with or without a reservoir), the energy input into the plenum is more or less capable of meeting the thermal demand so that the plenum temperature may be maintained substantially constant and therefore provide consistent cooks. Accordingly, the plenum in this instance serves only as a heat exchanger and not as a reservoir of hot air, and thus may be relatively small, thereby allowing the oven to be relatively compact.

The composition and dimensions of the thermal reservoir are preferably selected to provide both a high specific heat and a high heat capacity relative to the air disposed in the plenum. The high specific heat ensures that a unit mass of the thermal reservoir can surrender sufficient heat to warm up a high number of unit masses of the air disposed in the plenum, and the high heat capacity ensures that The total heat stored within The thermal reservoir is capable of heating a large mass of air disposed in the plenum without itself becoming unduly cooled.

Figure 5:
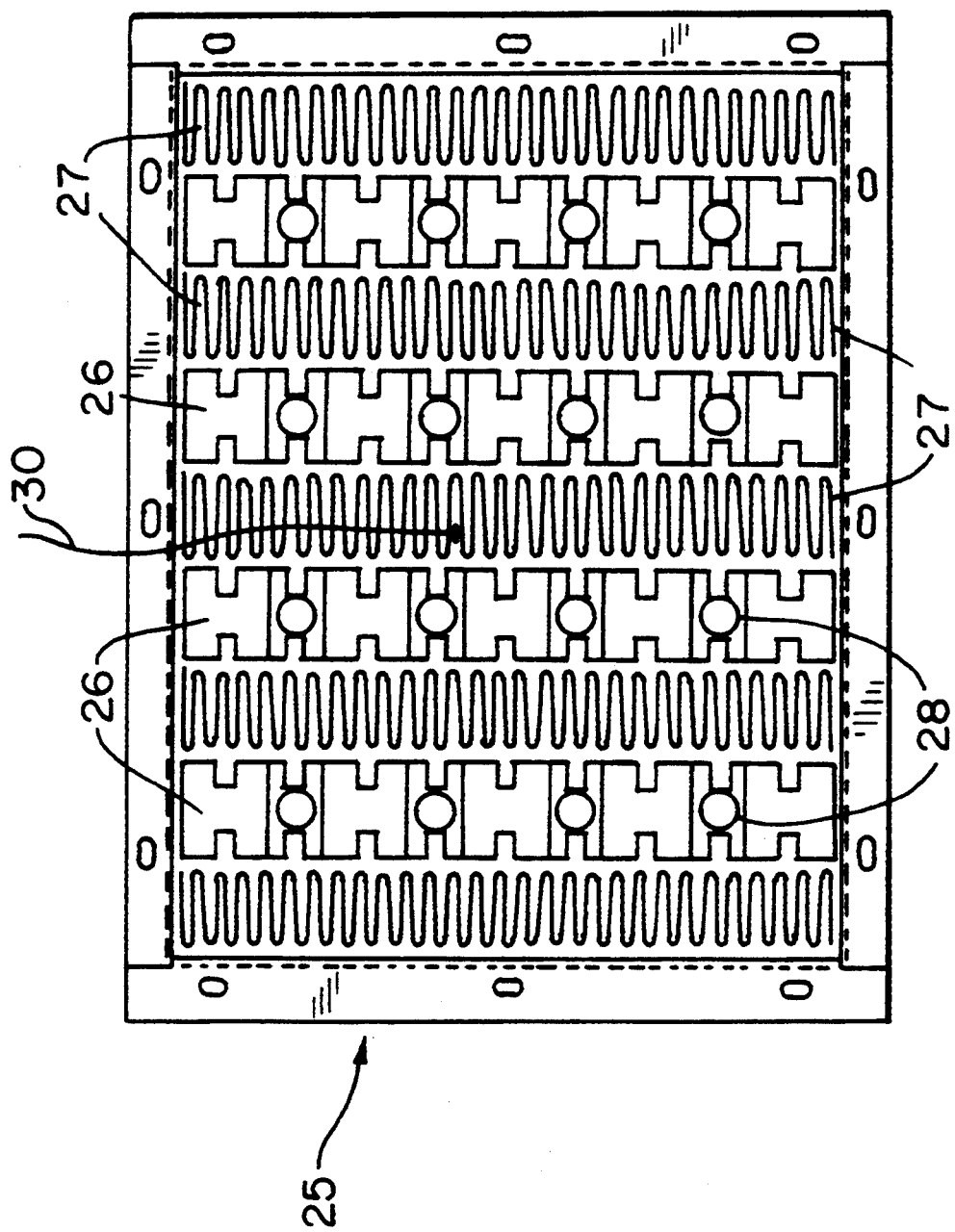
FIG. 5 is a front elevational view of the heat storage and transfer apparatus

Referring now to FIG. 5, it has now been found that the hot air in the plenum 18 may be maintained at a substantially constant temperature, despite substantial periodic thermal transfers to air passing through the plenum, without the use of an oversized plenum and without requiring a 220 volt power supply. Thus, in a preferred embodiment of the present invention, the thermal energy source 25 includes both a thermal reservoir generally designated 26 and actuatable heating means 28 for maintaining the thermal reservoir 26 at a high temperature, both typically (but not necessarily) being disposed in the plenum. The thermal reservoir 26 defines a large thermal mass of metal and a closed volume for maintaining the mass of metal therein, whether the metal is in the solid phase, the liquid phase, or combinations thereof. The metal is preferably selected from the group consisting of zinc and zinc alloys, with the specific alloy being selected for the desirability of its melting point (that is, where it undergoes a phase change between the liquid and solid phases), as well as its heat storage and heat transfer capabilities, its toxicity, and the like. A variety of other metals and their alloys having melting temperatures in the range of interest (i.e., approximately the maximum desired cooking temperatures) may be used instead of zinc. The zinc alloy is enclosed in a tube of stainless steel or other heat resistant metal with suitable means being provided in the tube to allow for its expansion as the zinc alloy expands.

Accordingly, even a low thermal energy source such as a 110 volt power supply can, over time, provide the metal of the reservoir 26 with sufficient energy to cause a substantial fraction of the metal mass to undergo a phase change, thereby absorbing a substantial amount of heat as the heat of fusion. Then, when the reservoir is later called upon to heat the air passing through the plenum, all of that accumulated heat of fusion may be used to heat the air without the reservoir undergoing any change in temperature. Preferably the metal of the reservoir has a potential total heat of fusion which is at least sufficient to cook a given single portion food product in the cooking chamber, and optimally sufficient to cook successively a plurality of given single portion food products in the cooking chamber without undergoing a change in temperature.

The reservoir 26 functions as a heat sink and, accordingly, may be suitably formed with an abutting series of thin fins 27 or plates running parallel to one another, optionally separated by spacers to provide spaces of approximately $\frac{1}{4}$ to $\frac{3}{8}$ in. in order to facilitate the movement of air between and about the fins 27 and, thus, the transfer of heat from the reservoir 26 to the air. The cylindrical rods (e.g., metal-sheathed ceramic rods) of heating means 28 are typically horizontally disposed, and the fins or plates 27 are also typically horizontally disposed but in vertically spaced planes (to minimize interference with the circulation of air within the plenum) and intermittently secured to electrical insulation about the coils of heating means 28. The heat transfer is maximized by providing a high ratio of the surface area of the heat reservoir 26 to the volume of air within the plenum 18.

The reservoir housing, and the abutting fins and spacers, must be formed of a material which can sustain the desired high temperatures over an extended period of time without adverse effects on the material from which it is formed, plated copper and steel being among those preferred for these purposes. The selected material must also be able to withstand thermal cycling from ambient temperatures to as high as, preferably, at least 700° F., although it will be appreciated that according to the present invention such thermal cycling may be severely limited, as the thermal reservoir will typically be allowed to cool from its elevated preheat temperature—namely, the phase change temperature for the phase change heat exchanger—to room temperature at most once per day (at the end of the work day) and, indeed, is preferably maintained constantly at an elevated preheat temperature ready for use at all times (much like a refrigerator is maintained constantly at a depressed cooling temperature). Accordingly, the metal used in the reservoir 26 has a long operative life since it is not cycled from cold (ambient temperature) to hot each time food is placed in the cooking chamber, but preferably stays hot once preheated. The reservoir 26 will, of course, be periodically re-heated by heating means 28 as necessary to maintain it at the desired temperature.

Where the phase change heat exchanger is employed, the requirement that the thermal reservoir be selected to provide both a high specific heat and a high heat capacity relative the air disposed in the plenum may be disregarded as the stored heat of fusion available for heating the ambient air in the plenum typically permits as high a number of unit masses of the air to be heated as necessary.

The heating means 28 is selected to enable the reservoir 26 and the air within the plenum 18 to be preheated to and maintained at an elevated temperature, preferably at 500°–540° F. (although optionally at 700° F. or higher), so that the plenum 18 acts as a kiln which, when once preheated, provides hot air to the cooking chamber 16 on demand, without any warm-up period, thereby rendering the preheated oven 10 immediately ready to cook with hot air impingement and, if present, microwaves. The heating means 28 may be a conventional heating coil—such as wire wrapped around a cylindrical ceramic rod—which, when electrically energized, over a prolonged period of time (typically a preheat of as much as one to two hours for a 110–120 volt power supply and as little as 20–30 minutes for a 220 volt power supply) is sufficient to bring the reservoir 26 and the ambient air within the plenum 18 to the desired operating temperature.

Operation of the heating means 28 may be controlled by the control means 250 to be discussed hereinafter, including a thermostat and a cut-off switch which cuts off power to the heating means 28 either when the power supply is being used for the magnetrons or hot air blower and there is insufficient power supply to enable the magnetrons, hot air blower and the heating means 28 to be simultaneously operated (i.e., in the 110–120 volt hybrid oven system) or when the actual temperature of the plenum exceeds a "set" temperature—typically the melting point of the metal mass therein in the phase change version. To this end, the reservoir is provided with a plenum temperature sensing mechanism 30 (such as a thermocouple) disposed so as to measure the temperature of the thermal mass.

While the control means 250 may continuously activate the heating means 28 until such time as the heating means 28 is cut off by the switch because the reservoir temperature exceeds the pre-set maximum temperature, in a preferred embodiment the control means actuates the heating means 28 in a manner to be described hereinafter.

For an oven 10 having dimensions of 30"×30"×33", the plenum 18 using the phase change heat exchanger may have the dimensions of 13"×9"×7" for a total capacity of about 0.5 cubic feet (about 0.25 cubic feet of that being available for air), and the cooking chamber 16 may have the dimensions of a cylinder 15" in diameter and 8" in height for a capacity of about 0.86 cubic feet, for cooking of a food product 12 having a maximum 12" diameter and a maximum 3.0" height.

Figure 2:
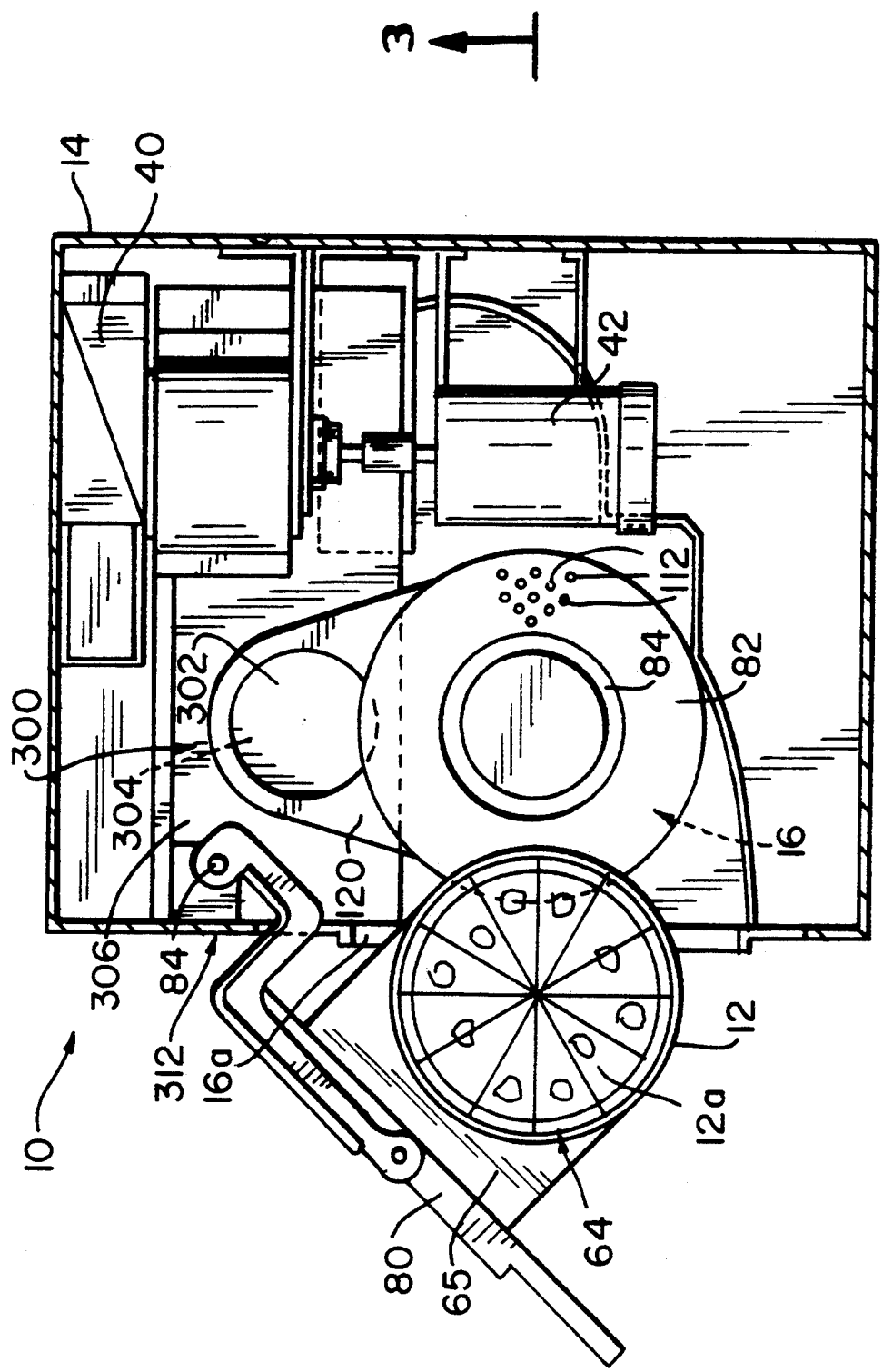
FIG. 2 is a top plan view thereof, taken along the line 2—2 of FIG. 1.
Figure 3:
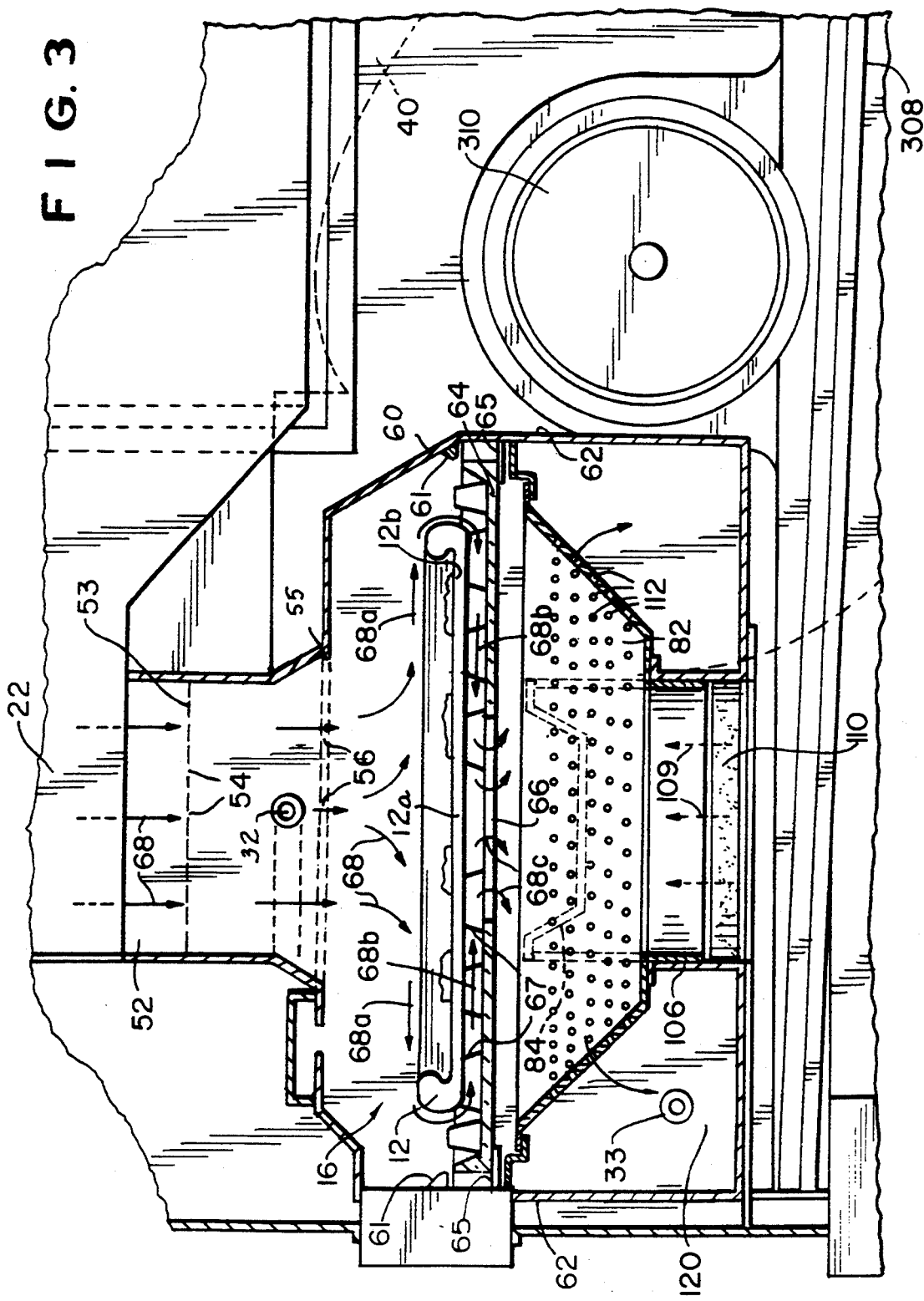
FIG. 3 is a fragmentary side elevational view of the cooking chamber and its related environment taken along the line 3—3 of FIG. 2 and illustrating the paths taken by the hot air downwardly (by solid arrows) and microwaves upwardly (by broken arrows) during use.
Figure 4:
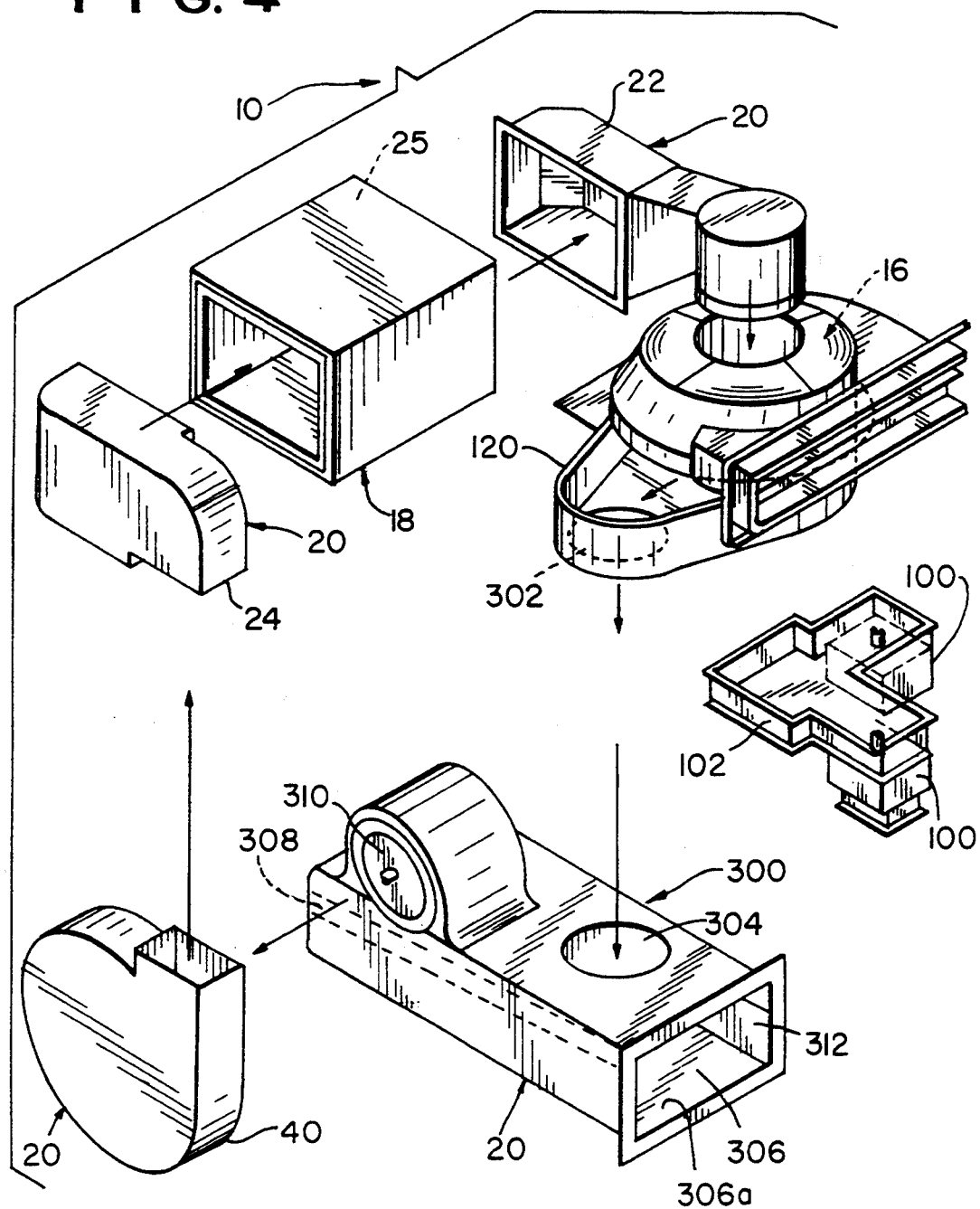
FIG. 4 is an exploded schematic view of the major systems of the oven.

Referring now to FIGS. 2–4 a hot air blower 40 is provided to circulate the air in the closed air system between the plenum 18 and the cooking chamber 16 and provide the hot air impingement function. The blower 40 is driven by a blower motor 42. The blower motor 42 preferably operates on a 110 volt power supply, although a 220 (typically actually 208) volt power supply may be used, depending upon the availability of the higher voltage power supply and the size of the blower. For a 30"×30"×33" oven, a blower having a capacity of 610 cu. ft./min. (4 inch water head) is suitable.

The blower 40 takes the spent hot air from the cooking chamber 16 and blows it through the egress 24 into the plenum 18 for reheating and recirculation. (As a safety precaution, the blower 40 is automatically deactivated when the door to the cooking chamber is open, thus precluding both accidents and the unintentional escape of heat from the oven through the cooking chamber opening 16a.) The hot air passing through the ingress 22 is communicated by a hot-air duct 52 into a diffuser 53 having generally vertically disposed apertures 54 in its bottom plate. The diffuser 53 is employed to even out and spread out the air flow emerging from the hot air duct 52. The air passing through the ingress duct 22 is traveling at a high velocity and with substantial force into the hot air duct 52; however, the air is not evenly distributed over as large an area as the cooking chamber cross section. This is significant as the cooking chamber may be configured and dimensional to receive either a large food product or a plurality of separate smaller food products arranged on the same cooking surface (such as three 6" diameter pizzas placed in a clover leaf arrangement on the refractory platter 64).

From the diffuser outlet apertures 54, the now spread out hot air passes through an inlet plate 55 having generally vertically disposed apertures 56 therethrough (which feed columnated jets of hot air into the cooking chamber 16), closely adjacent the upper surface of the food product 12 therein. Depending on the air distribution needs, the inlet plate 55 can easily be changed by the operator in a matter of moments when the oven is cool.

It will be appreciated that by those skilled in the cooking art that the production of a columnated air jets for impingement upon a food product may be generated by conventional impingement tubes, as disclosed in the aforementioned parent application, by a conventional inlet plate, as illustrated herein, or by like means.

The principles of operation of hot-air impingement cooking (whether using impingement tubes or inlet plate apertures) are well known in the art and hence need not be described herein in detail. The hot air is blown through the constricted diffuser apertures 54 and subsequently inlet plate apertures 56 by the blower 40 with sufficient pressure that the resultant columnated hot air streams, to a desired degree, drive away the typical boundary of cool air adjacent the food product and optimally continually drive away the moisture which forms at the surface of the food product, thereby enabling rapid cooking, browning or toasting of aligned areas of the food product by the hot air. Where the food product 12 is sufficiently small in diameter (or, if not circular, sufficiently small in length and width) relative to the array of inlet plate apertures 56, the hot-air impingement effect is directly obtained not only on the upper surface of the food product 12 (that is, the surface facing the inlet plate apertures 56), but also on the sides of the food product Impingement tubes may be used instead of the inlet plate, if desired.

However there is a well known problem with hot-air impingement cooking—namely, that only the areas of an initial surface of the food product directly exposed to (i.e., aligned with) the hot-air impingement tubes or inlet plate apertures are rapidly cooked, and the other areas of the initial surface, as well as the remaining surfaces (i.e., the opposite surface and possible the sides as well), are not cooked as rapidly. Such a problem can be severe where the food product 12 is particularly thick or where the non-directly exposed area of the initial surface of the food product or the remaining surfaces require substantially the same heat as the directly exposed areas of the food product. For example, where a pizza requires an even cooking and/or browning on the top surface, one or more of the topping ingredients (such as cheese) may cook and/or brown differently when directly exposed to (i.e., aligned with) the hot air impingement tubes or inlet plate apertures, than when not directly exposed thereto (i.e., not aligned therewith). Another example of this problem is where a pizza with a thick crust requires substantial cooking of the crust on the underside of the product, as well as the toppings.

Indeed, in order to ensure that not only the areas of a surface directly exposed to (i.e., aligned with) the hot-air impingement tubes or inlet plate apertures but also other (i.e., non-aligned) areas of the same surface receive comparable heating, many of the ovens utilizing impingement cooking provide means for moving either the food product relative to the columnated hot air streams (from the impingement tubes or inlet plate apertures) or moving the columnated hot air streams relative to the food product. Either way, the relative movement of the columnated hot air streams and the food product enables the impinging air to strike different selected areas of the food product at different times so as to achieve an overall even cooking of the surface directly exposed to the impingement tubes or inlet plate apertures and to allow the cook time reduction benefits resulting from air impingement to be distributed without resulting in substantial food product deterioration. However, these are not efficient cooking procedures as the hot air initially impinging on the selected areas of the food product bounces away from the food product so that the remaining heat therein is not employed to further cook other areas of the food product.

For this reason, many ovens relying on impingement cooking direct the impinging air, either simultaneously sequentially, against both opposing surfaces of the food product so that, for example, the top and the bottom surfaces of the food product receive the same or a similar degree of cooking. These solutions have not proven to be entirely satisfactory in use, however, as they dilute the rapid cooking advantages provided by the impinging air, require twice the number of impingement tubes or inlet plates and/or require the incorporation of structural elements to provide a desired relative motion in the cooking chamber between the food product and the inlet plates or impingement tubes. A preferred embodiment of the present invention minimizes or completely avoids these problems while initially directing air against the food product from only one side thereof, that is, the side of the diffuser 53 and inlet plate 55, and without moving either the food product 12 or the inlet plate 55.

Referring now to FIG. 3 in particular, the cooking chamber 16 is substantially air-tight so that all of the air passing from the plenum 18, through the diffuser 53 and air inlet plate 55, and onto at least a first surface 12a of the food product 12 (here, the top surface) returns to the plenum 18 only after it passes across the remaining portion of the first surface 12a, and across a substantial proportion of a second surface 12b of the food product 12 (here, the bottom surface) opposed to such first surface. The outwardly and downwardly angled configuration of the cooking chamber 16 above the level of the food product 12 increases the microwave cooking efficiency by reducing standing waves which typically occur within a rectangular or cylindrical cooking chamber and increases the hot air cooking efficiency (i.e., the heat transfer from the impinging hot air to the food product) by minimizing the dead-air zones which typically occur within a rectangular or cylindrical cooking chamber.

A refractory platter 64 of microwave-transparent and heat-resistant material (such as a ceramic) defines a central aperture 66 and a plurality of upwardly extending bosses 67. The ceramic platter 64 is supported by a platter support 65 extending inwardly from oven door 80 and acts as a food support. It is disposed in close but spaced relationship to the bottom surface 12b of the food product 12 which is supported on bosses 67. The air from the food product top surface 12a is forced to pass over the sides and substantially the entire radius of the food product bottom surface 12b before the air reaches the central aperture 66 of the ceramic platter 64 and is eventually lead into the plenum 18 by the return air duct 120 and blower 40 for reheating and recirculating.

More particularly, the cooking chamber 16, which may be round or polygonal (e.g., 12 sided) in cross-section, preferably has an outwardly sloping upper sidewall 60 and a generally vertical lower sidewall 62, the upper and lower sidewalls 60, 62 joining at an acute angle (preferably about 45°–60°) at a level adjacent the food product upper surface 12a and substantially above the upper surface of the ceramic platter 64. Preferably, a circumferentially-extending air-redirecting nose 61 is disposed on the inner circumference of the lower sidewall 62 and extends inwardly to redirect the downwardly moving hot air stream inwardly (as it passes the sides of the food product 12) towards the space intermediate the food product bottom 12b and the upper surface of ceramic platter 64. Alternatively, the upper and lower sidewalls 60, 62 may define a single outwardly bowed sidewall. As the ceramic platter 64 preferably extends essentially the full diameter of the plane of the cooking chamber 16 in which it is disposed, the central aperture 66 thereof is the only passage through which the spent air can escape the cooking chamber 16 and pass back to the plenum 18, and then only after passing across a substantial proportion of the food product 12 in the chamber 16. The exact proportion of the food product is preferably greater than 75% of the bottom surface area of the food, depending upon the relative sizes of the central aperture 66 and the bottom surface of the food product 12.

As illustrated by the solid line arrows 68 in FIG. 3, the hot air leaving the inlet plate apertures 56 strikes the upper surface 12a of the food product 12 in areas more or less aligned with the apertures 56. Some of the air is reflected upwardly to the upper sidewall 60 of the cooking chamber 16 and thence downwardly towards the lower sidewall 62 thereof. However, as illustrated by the solid line arrows 68a, most of the hot air which contacts the areas of the food product aligned with the apertures 56 is not reflected upwardly but rather drawn radially outwardly across the upper surface 12a and towards the side of the food product so that it passes over the areas of the upper surface 12b which are not aligned with the apertures 56 as well. The still hot air traveling radially outwardly over the non-aligned areas is in heat-transfer relationship with such non-aligned areas so that a rather uniform cooking of the entire upper surface 12a of the food product 12 is achieved without relative movement of the apertures 56 and the food product 12.

The upper surface of the ceramic platter 64 (assisted by the air-redirecting nose 61, when present) intercepts the still hot air (both that reflected downwardly by the upper sidewall 60 of the cooking chamber 16 and that passing over the upper surface 12a and sides of the food product 12) and prevents it from leaving the cooking chamber 16 until, as illustrated by solid line arrows 68b, it has passed radially inwardly, intermediate the bottom surface 12b of the food product 12 and the upper surface of the ceramic platter 64, and in heat-transfer relationship with the bottom surface 12b, until it reaches the platter central aperture 66 and passes downwardly therethrough, as illustrated by solid line arrows 68c. During its entire passage along the bottom surface 12b of the food product 12, the hot air is cooking the bottom surface 12b of the food product 12, thus providing an enhanced cooking of that bottom surface 12b. The air passing through the central aperture 66 of ceramic platter 64 is eventually returned to the blower 40 via various return air holes 112 which will be described hereinafter, and then from the blower 40 through the egress 24 into plenum 18 for reheating and recirculation. The central aperture 66 and the return air holes 112 are desirably large enough to preclude an airflow bottleneck from developing, the central aperture 66 typically being the controlling factor as it is easiest to remove and replace.

The appropriate spacing between the bottom surface 12b of the food product 12 and the upper surface of the ceramic platter 64 is selected so as to achieve maximum cooking of the food bottom surface 12b without unduly limiting the flow of air through the oven. As all of the air is flowing in the same direction under the food product 12—namely, horizontally and radially inwardly—there a good heat-transfer relationship between the air stream and the food bottom surface 12b. Preferably the vertical spacing therebetween is small so that the gas flow rate is relatively high and therefore sweeps away the boundary layer about the food bottom surface 12b (much as the impinging air sweeps away the boundary layer on the food upper surface 12a.)

To maximize heat transfer to the underside 12b of the food, the height of the bosses 67 should be as low as possible without restricting airflow (so that the size of the central aperture 66 is the limiting factor). Conversely, to reduce heat transfer to the underside 12b, the height of the bosses 67 should be increased to bring less of the hot air stream into contact with the underside 12b of the food (due to more volume between the ceramic platter 64 and the food underside 12b) without affecting air velocity. A slight increase in the radius of the central aperture 66 will result in a substantial increase in air velocity, both on the top and bottom surfaces 12a, 12b of the food, where the central aperture 66 is the limiting factor on airflow in the system (rather than the vertical distance between the underside 12b of the food and the top of the ceramic platter 66).

It will be appreciated by those skilled in the art that the above-described flow of air from the plenum 18 through the cooking chamber 16 and back to the plenum 18 under the influence of blower 40 permits simultaneous cooking of both the entire upper surface 12a and the lower surface 12b of the food product 12 (as well as the sides thereof) without the need for relative movement of the inlet plate apertures 56 and the food product 12, or the use of inlet plate apertures 56 disposed on both opposed surfaces 12a, 12b of the food product. Accordingly, the food product 12 does not have to be mounted on a conveyor which transports the food product past the inlet plate 55, and the inlet plate 55 does not have to be oscillated to ensure that all areas of the upper surface 12a of the food product 12 encounter hot air, although the beneficial effects of the air flow path of the present invention are still obtained in the presence of such relative movement. Furthermore, the oven does not require inlet plate apertures 56 directed at the bottom surface 12b of the food product 12 as well as the upper surface 12a. Accordingly, the oven of the present invention not only cooks faster and more evenly, but is more economical to manufacture and operate, more compact, and more reliable as there are fewer moving parts.

The hot air which impinges upon the upper surface 12a of the food product 12 is then sucked radially outwardly, and not simply reflected upwardly where it would contribute to the turbulence which is normally found above a food surface where high velocity air has been perpendicularly directed downwardly thereon. Accordingly, the channeling of the impinging hot air streams not only serves the valuable function of ensuring that all areas of the food product 12 are cooked thereby, but also eliminates one of the major problems associated with hot air impingement cooking—namely, the creation of turbulence which impedes subsequent hot air impingement cooking because it breaks up and diverts the columnated air jets. Most importantly, the hot air initially impinging on selected areas of the food product is thereafter forced into and maintained in heat transfer relationship with other areas of the food product so that the heat value of the hot air is efficiently used to heat the other areas of the food product as well.

As best seen in FIG. 3, a metallic screen 82 with the configuration of a bowl is dispersed below the ceramic disc 64 which supports the food product 12. The screen 82 is attached to the circular waveguide 106 within return air duct 120 and defines return air holes 112 communicating with the return air duct 120 leading to blower 40. The size and spacing of the return air holes 112 of metallic screen 82 cause any microwaves which have been downwardly reflected by the food product 12 or the upper portion of cooking chamber 16 to be redirected upwardly where they are used for cooking.

Preferably an imperforate debris bowl 84 (best seen in FIG. 2) is disposed in screen 82 and supported by the top of the circular wave guide 106. The bowl 84 is easily removable from the oven 10 simply by opening the door 80 (thereby moving ceramic platter 64 out of housing 14), lifting the debris bowl 84 (so that the base thereof is above the top of screen 82) and then moving it laterally out through the opening 16a of the cooking chamber 16 (see FIGS. 1–2). This permits the debris, juices and the like which drop from the food product 12 during cooking thereof and fall onto the debris bowl 84 to be easily removed therefrom externally of the oven 10.

Those skilled in the oven art will readily appreciate that, where appropriate for the particular food products 12 to be cooked, the entire operative configuration of the oven 10 can be inverted so that the hot air inlet plate 55 is disposed below the food product 12, so as to directly force the hot air against the bottom of the food product 12, and the ceramic platter 64 is disposed above the top of the food product 12, so as to force the reflected air to travel across a radius of the upper surface of the food product 12. (Of course, in this instance a different support for food product 12 would be required.) Indeed, in those particular instances where it is desirable to maximize cooking of one surface at the expense of the other surface, the surface to be highly cooked may be disposed directly opposite the inlet plate 55, and the ceramic platter 64 eliminated so that the other surface is only lightly cooked. It should also be understood that the number of diffuser apertures 54 and inlet plates apertures 56 illustrated is only representative so that more or fewer apertures 54, 56 may be used, and that the vertical spacings of the apertures 54 and the ceramic platter 64 from the adjacent surfaces 12a, 12b of the food product 12 (e.g., about 4 inches and about ½ inch, respectively) have not been illustrated to scale as the actual spacings will depend on the particular intended applications of the oven.

Where there will be a plurality of ovens according to the present invention in close proximity to one another, as might be the case in a restaurant, economies can be achieved by providing the various ovens with a common plenum which is interconnected with the cooking chambers of the various ovens so as to provide them with hot air for impingement cooking. The common plenum would, of course, be oversized relative to the plenum of a single oven, as would the thermal reservoirs and heating means thereof. But, since the demands placed upon the common plenum by the various individual cooking chambers will presumably average out over time, the common plenum is less likely to be subject to extremely high demands for hot air at any given time and thus can have proportionately less "reserve" heating capacity than would be true of a single plenum dedicated to a single cooking chamber.

Because the debris bowl 84 and the return air holes 112 of the return air duct 120 are not 100% effective in trapping the grease and other debris (especially where the debris is in liquid or airborne form), in a preferred embodiment of the present invention a filter box, generally designated 300, is provided. The air stream containing the debris passes, from the cooking chamber 16, through aligned apertures 302, 304 of the return air duct 120 and filter box 300, respectively, and into a filter duct 306. The cross-sectional area of the filter duct 306 is substantially larger than the aligned apertures 302, 304 so that the air entering the filter duct 306 slows down, thus permitting many of the airborne solids to drop out onto the bottom surface 306a of the filter duct 306. Additionally, the bottom surface 306a of the filter duct 306 is preferably cooler than cooking chamber 16 or return air duct 120 (which is typically greatly heated by the hot air stream leaving the cooking chamber 16). The relative coolness of the duct lower surface 306a can be obtained by judicious placement thereof away from heat sources and, where magnetrons are present in the oven to generate microwaves, by causing the magnetron cooling fans to blow air over the bottom surface of fitter duct 306. The relatively cool surface 306a causes the airborne grease to liquify and condense thereon, where it may be easily removed by periodic cleaning. The air flow through the filter box 306 then passes through a filter screen 308 leading to the filter box outlet 310 and hence the blower 40. The filter screen 308 is easily removable through a passageway 312 in the front of the oven 10, the passageway 312 being provided with a cover 314.

Typically the filter screen 308 is removed at the end of each working day to permit removal of debris therefrom, while the bottom surface 306a of the filter box 306 (also accessible through the passageway 312 when the cover 314 is removed) only requires cleaning after a week or so of operation of the oven, depending on the type of food being cooked. The debris bowl 84 may be removed and cleaned as necessary, typically at least once per day where the oven is in continuous use, but this will vary with the type of food being cooked.

While the oven 10 of the present invention may utilize a constant-speed blower (actually a constant-speed motor driving the blower) in combination with a series of doors, louvers, valves, and the like for controlling the communication of air between the plenum and the cooking chamber, only a gross level of control can be achieved by such a structure. Accordingly, in a preferred embodiment of the present invention the blower 40 is a variable-speed blower (actually a variable-speed motor driving the blower), and thus there is no need for any doors, louvers, valves or the like to control the flow of air between the plenum and the cooking chamber. Commercially available variable-speed blowers can selectively and variably provide gaseous communication between the plenum and the cooking chamber in increments as low as 5% of the maximum flow rate, and in some instances as low as 1% of the maximum flow rate. Thus the variable-speed blower allows a fine control over the air flow between the plenum and the cooking chamber, and thus the heat introduced into the cooking chamber from the plenum.

It will be appreciated that an oven of the present invention utilizing a phase change heat exchanger necessarily operates on different principles than a conventional hot air oven. In a conventional hot air oven one may vary not only the cooking time, but also the hot air temperature (within limits) by controlling over time the power being introduced into the system for the generation of thermal energy. However in the present invention the hot air temperature is substantially fixed under normal conditions at the phase change temperature. But it has now been found that a variable-speed blower may be used to change the effective hot air temperature—that is, the temperature seen by the food product 12—by varying the speed of the impinging hot air and thus the thickness of the remaining boundary layer. As the boundary layer is thinned, the food product sees a hot air temperature which is higher—that is, closer to the true temperature of the hot air.

The control means 250 receives readings from at least two temperature sensors or thermocouples. One thermocouple 30 (see FIG. 5) is disposed within the phase change heat exchanger and informs the control means of the temperature within the plenum, a temperature which under normal conditions should remain fairly constant at the phase change temperature where there is a phase change heat exchanger, as discussed above, but which may very appreciably otherwise (i.e. when there is not a phase change heat exchanger). Another thermocouple 32 (see FIG. 3) informs the control means of the temperature within the cooking chamber 16, and more particularly the temperature at the upper surface 12a of the food product 12. This cooking chamber thermocouple 32 is typically disposed adjacent the top of the cooking chamber 16 and, as illustrated in FIG. 3, may be just above the inlet plate 55 to protect it from the microwaves in the cooking chamber. As the impinging hot air substantially removes the cool boundary layer about the food product 12, thermocouple 32 is highly sensitive to the temperature at the upper surface 12a of the food product 12 and is typically related thereto (for example, constantly reading a fixed number of degrees higher than the temperature at the upper surface 12a).

In a preferred embodiment of the present invention the control means 250 provides "on the fly" automatic control of the cooking operation. With manual control means, the user enters by means of a control panel the cooking time and temperature settings (the latter often being determinative of a thermostatically controlled hot air supply in a hot air oven or the level of microwave generation in a microwave oven). However, the user of an automatic control means must keep track of and enter the appropriate settings for particular food products. This is undesirable in the fast food industry where it is essential to simplify every routine aspect of the job as much as possible. With "static" automatic control means, the user has only to enter by means of a control panel the type of food to be cooked, and the control means selects the appropriate time and temperature for that particular food product from a table stored in memory (in other words, 40 seconds of 515° F. air, either alone or in combination with so many seconds of microwave heating at a particular microwave level, starting at a particular point in the hot air heating cycle). However the control means continues to use that temperature and time setting regardless of what in fact is going on in the cooking chamber.

By way of contrast, the "on the fly" automatic control means 250 of the present invention enables the parameters to be varied as necessary on the fly to achieve the optimal cooking under the possible operating parameters of the oven and regardless of the information communicated to the oven by the user. The control means 250 achieves this by storing in memory not just a single setting for each food product. Rather, the table stored in memory contains the appropriate or expected maximum and minimum temperature values for various time stages in the cook cycle, optionally stored as a differential range between the temperature of the plenum and the temperature of the cooking chamber. As the plenum temperature after warm-up is maintained substantially constant by the phase change heat exchanger, the control means may adjust the cook cycle by relying exclusively on the expected settings for the cooking chamber thermocouple. Absent a phase change heat exchanger, however, the plenum temperature may vary so that the control means should rely on an expected differential between the plenum temperature and the cooking chamber temperature, and this expected temperature differential may be stored in the memory.

Typically the time stages are arbitrarily divided into intervals of 5 to 10 seconds or the like. Periodically during the cooking operation, the measured values of temperature are compared to the expected values of temperature and, when the measured values deviate significantly from the expected values, the cook settings are adjusted accordingly. For example, if the plenum thermocouple 30 indicates that the temperature in the plenum (that is, the temperature of the hot air being provided to the cooking chamber) has dropped below the expected value, then the heating cycle is extended. If the cooking chamber thermocouple 32 indicates that the temperature at the food product upper surface 12a has risen above the expected value, then the cook cycle is reduced in duration. If the cooking chamber thermocouple 32 indicates too low a temperature relative to the expected value, then the cooking cycle may be extended in duration. Accordingly, even where the user has introduced an error into the system—for example, by placing a frozen product into the cooking chamber while indicating to the control panel that a refrigerated product was to be cooked—the control means 250 will detect this (because the thermocouple readings are out of line with the expected values) and adjust to the realities of the situation as determined by the temperature profiles of the thermocouples.

It will be appreciated that, during the first ten seconds or so of cooking, the readings of the cooking chamber thermocouple are affected by various extraneous short-term factors, such as how long the oven door was open, the effect of the boundary layer about the food product, and the like. Accordingly, the control means 250 takes no action to modify the cooking cycle from that selected by the user (by indicating the type of food product on the control panel) until after the passage of an appropriate time interval (e.g., 10 seconds). Thus the control means causes the blower 40 to blow gas from the plenum through the diffuser apertures at a predetermined flow rate appropriate to the particular food product during an initial portion of the cooking cycle, and only thereafter adjusts the gas flow rate at various points in the cooking cycle to maintain an appropriate cooking chamber temperature or appropriate temperature differentials between the temperature of the plenum and the temperature of the cooking chamber.

The control means 250 further includes means for actuating the heating means in the plenum in response to at least one factor selected from the following group: (a) a drop in the temperature of the thermal reservoir, (b) a drop in the temperature of the cooking chamber (and more particularly the top surface of the food product in the cooking chamber), (c) a calculated thermal loss from the oven, and (d) combinations thereof. The drop in the temperature of the thermal reservoir and the drop in the temperature of the cooking chamber are, of course, determined from the readings of the plenum thermocouple 30 and the cooking chamber thermocouple 32, respectively.

The thermal loss from the oven over a given period of time is calculated from various factors, including at least one of the following: (a) the thermal energy loss from the cooking chamber to ambient gas, (b) the thermal energy loss from the cooking chamber to a food product cooked in the cooking chamber, (c) the thermal energy generated by the heating means, and (d) combinations thereof. The loss of thermal energy from the cooking chamber to ambient gas typically occurs through the aperture 16a when the door 80 is open and can reasonably be determined as a function of the time the door is open despite minor variations due to the temperature of the ambient air, the extent to which the door was open (either fully or half open), and the like. The thermal energy generated by the heating means is easily calculated as a function of the rating of the heating means and the time that the heating means was actuated. The thermal energy transferred from the cooking chamber to the food product cooked in the cooking chamber is known through empirical testing for each particular food product (this being a possible source of error where the food product entered by the user on the control panel, which calls from memory a set of programmed cook settings, is inaccurate). Also taken into consideration is the thermal loss from the oven (e.g., heat loss through the walls of the oven housing 14), etc.

In a preferred embodiment of the oven, a third thermocouple 33 is disposed within the return air duct 120, out of the travel path of the microwaves represented by arrows 109 in FIG. 3. The combination of the second thermocouple 32 disposed just above the cooking chamber and the third thermocouple 33 disposed just below the cooking chamber (both preferably shielded from the effects of the microwaves) enables an extremely accurate determination of the thermal energy which is transferred from the cooking chamber to the food product cooked in the cooking chamber since the temperature of the incoming and outgoing air streams are known. Thus, where it is described hereinabove that the control means 250 receives readings from at least two temperature sensors or thermocouples, it may receive readings from three temperature sensors or thermocouples. The thermocouple 30 disposed within the heat exchanger is provided only so that the control means 250 may exercise its supervisory functions with respect to the heat exchanger, while the thermocouples 32, 33 about the cooking chamber are used to monitor the cooking chamber temperature. Thus the control means 250 may store in its memory the appropriate or expected maximum and minimum temperature values for various time stages in the cook cycle, preferably stored as a differential range between the temperature of the gas entering the cooking chamber, using thermocouple 32, and the temperature of the gas leaving the cooking chamber, using thermocouple 33. As noted above, this provides a method by which the control means 250 may closely track the thermal energy loss from the cooking chamber to the food product being cooked therein.

It will be appreciated that, because the actual temperatures are being measured against the expected or stored temperatures for points within the cooking cycle, it is not necessary that the cooking chamber start from a "cold" or room temperature condition. Accordingly, the control means periodically actuates the blower to maintain the cooking chamber at least a predetermined minimum temperature between cooking cycles. For example, at fixed time intervals (say, of about a minute) or whenever the cooking chamber thermocouple indicates that the cooking chamber is below a predetermined minimum temperature, the blower may be actuated so that hot air from the plenum brings the cooking chamber temperature above the predetermined minimum temperature (typically in about 15 seconds or less).

Once turned on, the control means 250 performs a wide variety of initial testing to ensure that each operable element of the oven is in working condition and the overall oven is safe for operation. Among the elements tested are safe closing of the doors (to prevent loss of RF and thermal energy), RF leakage, magnetron effectiveness, heat exchanger operation, heating element operation, blower operation, magnetron operation, and the like. Depending upon the type of irregularities detected (for example, whether they affect safety and whether cooking can be performed despite the irregularity), the irregularity is reported by a voice synthesizer or pre-recorded message generator (not shown), display (e.g., an LED display), or both, and the oven operation allowed to continue or terminated at once.

Furthermore, during actual cooking operations an abbreviated set of "cook checks" is almost continuously repeated to ensure that the doors are safe (closed), that there is no RF power leakage, that the RF power is within appropriate limits, that the heat exchanger temperature is less than a predetermined maximum, that the cooking chamber temperature is within appropriate limits, etc. Again, in some instances the control means will ask for corrective action (such as shutting the door) and proceed once the corrective action has been performed; in other instances it will terminate operation of the oven for safety reasons (e.g., where RF power is leaking or any of the temperatures have exceeded the maximum) and in still other instances it will take appropriate action on its own (for example, by raising the magnetron or heating means power level where it is too low).

Figure 6:
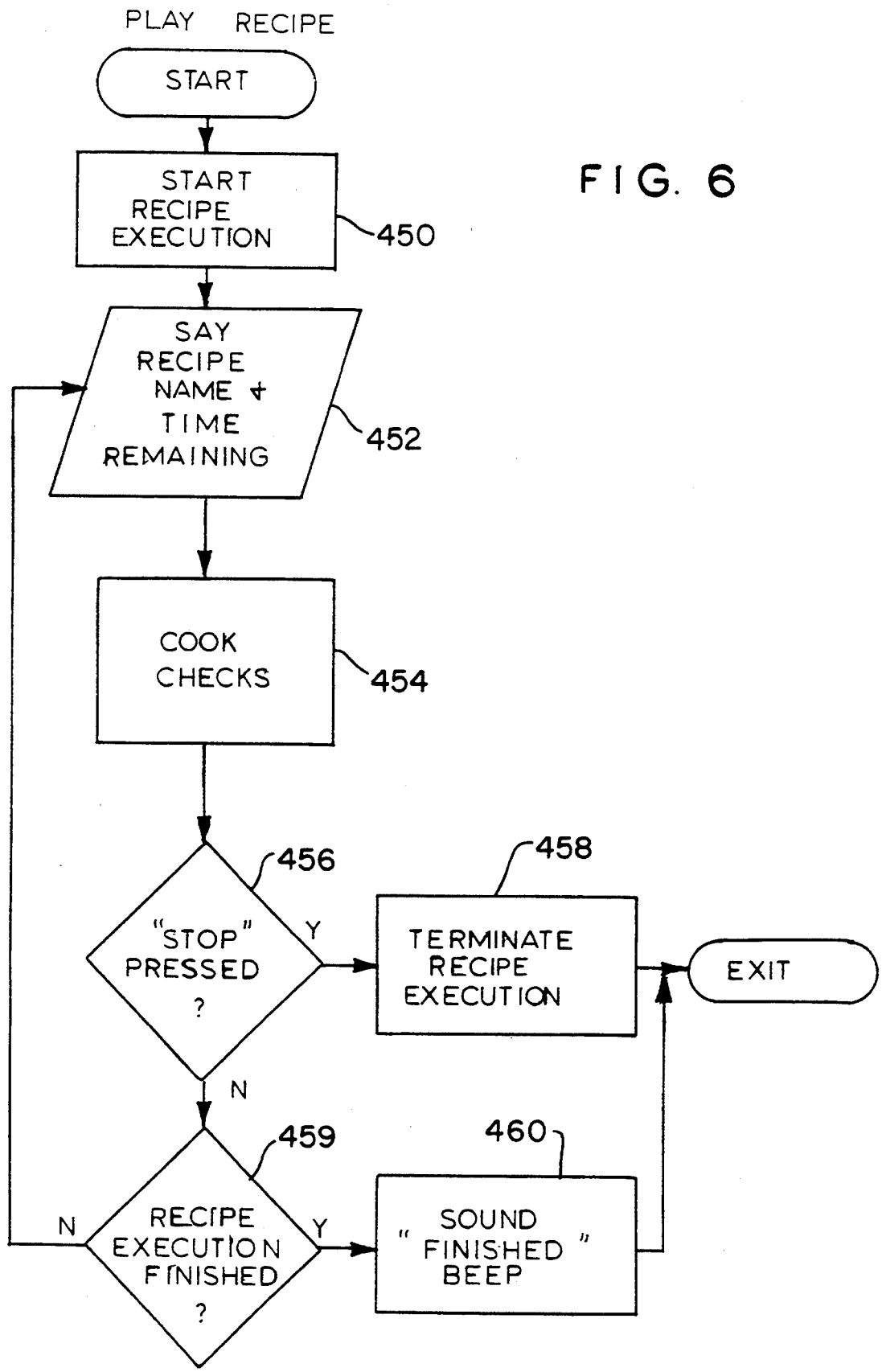
FIG. 6 is a flow chart of the primary operating sequence.

While a rather high level of sophistication is required to initialize the oven 10 (e.g., to enter the cook parameters for particular food products), the user of the already initialized oven will find the oven 10 exceptionally simple to operate and even capable of correcting user errors. Referring now to FIG. 6, the user has only to open the oven door, place the food product on the cooking surface (i.e., the bosses 67 of ceramic platter 64), and close the door. He then presses the appropriate button on a control means input panel indicating the type of food product which the has inserted (e.g., small pizza, large pizza, chicken slice, frozen pizza, or the like) and finally presses a "START" button (see box 50). The control means 250 responds by saying the name of the food product ("RECIPE") and how much time it will take to complete cooking of the food product 12 (see box 452). As will be explained hereinafter, a series of cooking checks are then performed (see "cook check" subroutine box 454). The control means then determines whether or not "STOP" has been pressed by the user (see decision diamond 456) and, if so, terminates the RECIPE execution (see box 458). However, if "STOP" was not pressed, then the control means determines whether or not the RECIPE execution has been completed (see decision diamond 459) and, if so, sounds a "FINISHED" beep and prepares to receive a new RECIPE for execution (see box 460). However, if the RECIPE execution was not finished, the control means returns to box 452, repeating the RECIPE name and the time now remaining (possibly as modified by variations made therein as part of the "cook check" subroutine).

Figure 7B:
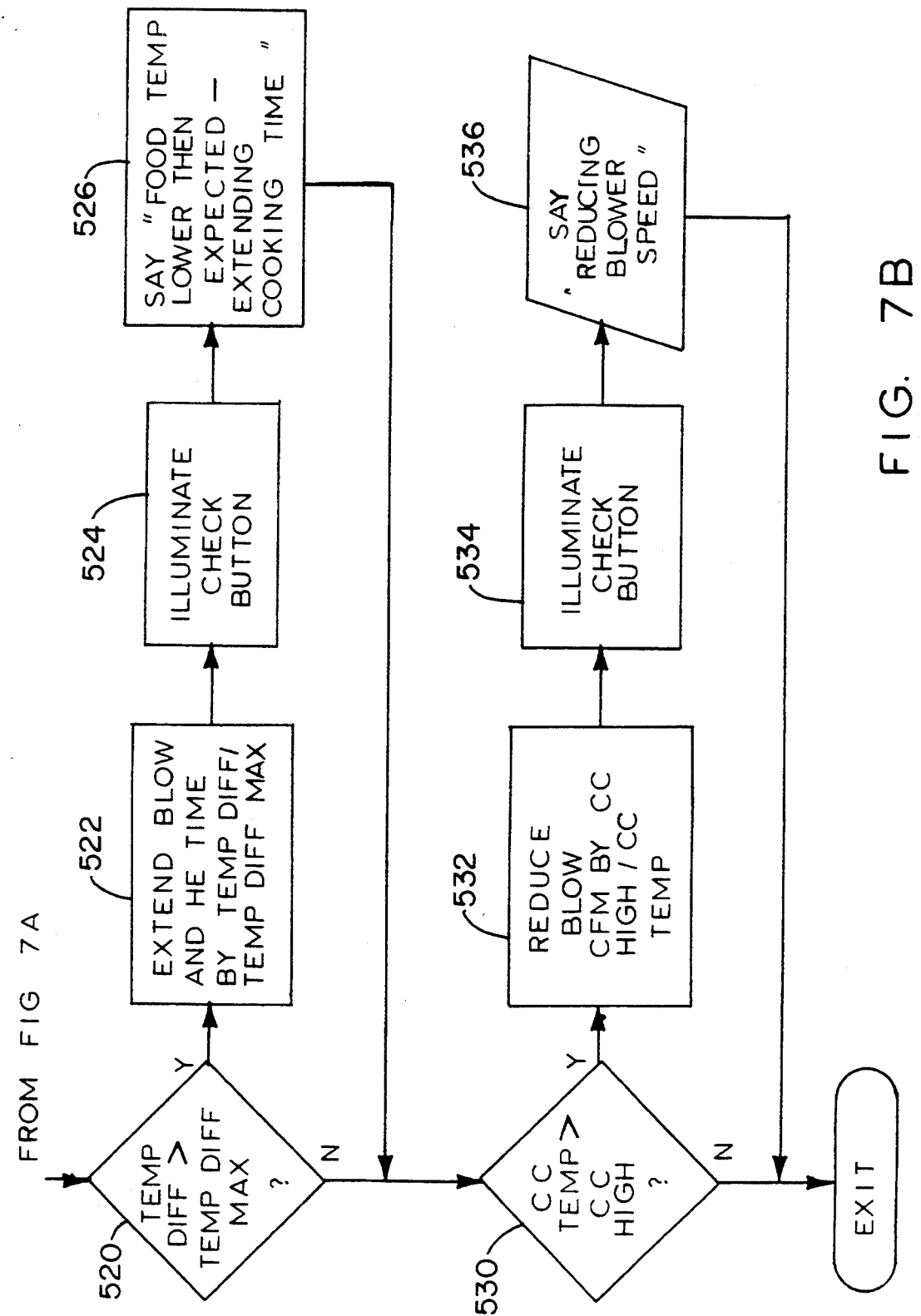

Referring now to FIGS. 7A and 7B, therein illustrated are selected cook checks performed by the control means 250 (as part of the "cook check" subroutine) which result in either a variation of the cooking time or blower speed. Before any checks are made, the control means determines that the blower has been on for at least ten seconds (see decision diamond 500) and that it has been at least ten seconds since the recipe started (see decision diamond 502), so that initial aberrant readings are ignored. Then the control means determines whether the cooking chamber temperature is less than a set point or expected temperature determined by reference to the table stored in memory (see decision diamond 504) and, if so, takes appropriate action by extending the blower and heating element times a percentage related to the percentage of the set point used in the test (see box 506). In other words, where the cooking chamber was tested against x percent of the set point, then the blower and heat exchanger times would be extended by (100−x) percent. Further, the control means 250 illuminates an appropriate check button on the control panels (see box 508) and indicates (either orally or through a display), "Extending cooking time" (see box 510). Next the control means 250 determines whether the temperature differential between the two thermocouples 30, 32 is greater than the set or stored expected maximum differential (see decision diamond 520); if so, it extends the blower and heat exchanger time by the ratio temperature differential/temperature differential maximum (see box 522), illuminates an appropriate check button (see box 524) and says, "Food temperature lower than expected, extending cooking time" (see box 526). Finally, the control means 250 checks whether the cooking chamber temperature indicated by the cooking chamber thermocouple 32 is greater than the expected value in memory (see decision diamond 530); if so, it reduces the blower speed by the ratio of the cooking chamber expected high temperature over the cooking chamber temperature (see box 532), illuminates the appropriate check button (see box 534) and says, "Reducing blower speed" (see box 536). It will be appreciated that the cooking chamber expected high temperature against which the cooking chamber temperature is measured (in decision diamond 530) is a cooking chamber temperature less than the cooking chamber maximum temperature. Where the cooking chamber maximum temperature is exceeded, there is a shutdown of the oven for safety reasons.

Turning now to the microwave-cooking feature of the present invention, microwave ovens are well known in the art and hence need not be described in great detail herein. Referring now in particular to FIG. 4, a pair of magnetrons 100 are disposed so that the microwave output therefrom is discharged into the legs of an angled, common waveguide generally designated 102. The impedances of the two magnetrons 100 are deliberately mismatched to preclude the output of one magnetron 100 being communicated to the other magnetron 100. While the magnetrons 100 are preferably operable on a 110 volt power supply, where a 220 or higher voltage supply is available (such as in a restaurant or commercial establishment), a higher voltage power supply may be used and, indeed, the two magnetrons may even be replaced by a single, large magnetron thereby eliminating the need for an angled waveguide intermediate the circular waveguide 106 and the magnetrons. A magnetron cooling means, such as a blower (not shown), provides cooling air to the magnetrons 100 via cool air ducts.

The common waveguide 102 preferably has the configuration of a right angle, with each leg constituting a rectangular waveguide and the apex or junction acting as a coupler, permitting the microwaves from each leg or rectangular waveguide of the angled waveguide 102 to be fed into a circular waveguide 106 thereabove. The common waveguide 102 and the circular waveguide 106 are welded together to preclude arcing therebetween or any escape of the microwaves from therebetween. The circular waveguide 106 in turn discharges the microwaves fed thereinto upwardly towards the cooking tray 64 and the food product 12, as illustrated by the broken line arrows 109 on the left of FIG. 3.

More particularly, at the base of the circular waveguide 106, where it is connected to magnetrons 100 by a coupler and the rectangular waveguide legs of the angled waveguide 102, a heat seal 110 is provided so that the hot air from the cooking chamber 106 cannot approach any further the relatively delicate magnetrons 100. The heat seal or barrier 110 is formed of a microwave-transparent and heat-resistant material, such as a ceramic. In a preferred embodiment of the present invention, at the place of manufacture the microwave generation and transmission apparatus—including the magnetrons 100, common waveguide 102, heat barrier 110 and circular waveguide 106—may be moved vertically upwardly and downwardly relative to the cooking tray 64 so as to focus the microwaves on a hypothetical food product on cooking tray 64. To preclude the escape of microwaves from the intersection between the microwave generation and transmission apparatus described above and the return air duct 120 through which the circular waveguide 106 extends, each is provided with a microwave seal in the form of a metal plate of about 5–6 inches extending thereabout. The microwave seal of the microwave generation and transmission apparatus is movable therewith to approach or retreat from the stationary microwave seal of the return air duct 120.

In order to minimize the escape of heat from the interior of the cooking chamber 16 through the front opening 16a thereof during cooking and any time access thereto is not required, the cooking chamber 16 is provided with a door 80 which in its closed position (illustrated in FIG. 3) precludes the escape of heat therethrough, and in its open position (illustrated in FIGS. 1–2) exposes the opening 16a thereof for passage therethrough of the food product 12.

In order to enable the food stuff 12 to be easily, safely and rapidly placed in the cooking chamber 16, the ceramic platter 64 is preferably mounted on a platter support 65 secured to door 80 for movement therewith. The door/support assembly 80/65 is pivotably mounted by a pivot mechanism 84 within the interior of housing 14 (see FIG. 2) so that the ceramic platter 64 can be swung from a loading/unloading position totally outside the oven proper (as illustrated in FIG. 1), through an intermediate position (illustrated in FIG. 2), into a cooking position (illustrated in FIG. 3) wherein it is totally within the cooking chamber 16. The user places the food product 12 to be cooked on the ceramic platter 64 (which then supports the food product 12) and closes the door 80 to move the food product into the cooking chamber 16.

Referring now to FIG. 1, therein illustrated is the oven control panel generally designated 200 and including a status display 202 such as an LED panel, a data entry system 204 such as a keypad with buttons labeled for the various food types and three button switches labeled "START," "STOP," and "MAINTENANCE," respectively.

The status display 202 displays the data being entered into the system through the buttons 204, informational messages to the user, and the current function of the machine. The keypad 204 may include ten digital or numeric keys which function as numbers or, alternatively, each of the keypad buttons may act as a numeric key when the oven is in the maintenance mode. Thus the maintenance switch may act as a shift key to cause the control panel to enter a specific mode for the entry of numeric data from the buttons of keypad 204. Actuation of the MAINTENANCE button switch causes the control panel to enter the maintenance mode, with the display 202 indicating that the oven is in the "maintenance mode." The buttons now are in a shift mode and are redefined to perform various diagnostic and related functions useful for initialization, maintenance, shipping and the like.

The START and STOP button switches are function keys that do not require any other input. The START button initiates the cooking cycle, and the STOP button stops the cooking cycle and can be used as an alternative to the cycle time simply counting down to zero.

Control means 250, associated with the control panel 200, provides means for actuating the microwave cooking means (that is, the magnetrons 100) and the impingement-causing means (that is, the blower 40) in timed relation to one another. Depending upon the preferred cooking cycle for the food, the impingement-causing means and the microwave cooking means may be actuated substantially simultaneously. However, since the actuation of the blower 40 at the same instant as the actuation of the magnetrons 100 may result in a power fluctuation and activate the various safety mechanisms desirably provided to detect such power fluctuations, it is preferred that the blowers 40 be actuated at least about two seconds prior to actuation of the magnetrons 100. For particular food products, both microwave and hot-air impingement cooking may proceed for The same period of time, or one or The other cooking function may commence before and/or terminate after the other cooking function. For example, certain foods (e.g., unfrozen foods) may require a relatively short microwave cooking period relative to a hot-air impingement cooking period so that the hot-air impingement cooking period may commence prior to actuation of the microwave cooking and continue after deactuation of the microwave cooking. Typically both functions are active concurrently for at least a period of time.

The controls means 250 causes the heating means 28 to preheat the thermal reservoir 26 and the ambient air in the plenum 18 at a time prior to actuation of impingement-causing means 40 (and preferably prior to actuation of microwave-cooking means 100 and impingement-causing means 40) which is substantially greater than the cooking time required for the food product 12. Depending upon such factors as the size of the plenum 18, the power supply used by the heating means 28, the desired temperature of the ambient air within the plenum, and the like, the oven 10 is preheated—that is, the heating means 28 are actuated—a substantial period of time prior to the oven actually being used for cooking. Where only a 110 power supply is available to the heating means 28, typically the preheating period is about 1-2 hours prior to use of the oven. Initiation of the preheat may be performed by a timer so that the preheat of the oven 10 is accomplished before personnel arrive to use the oven. Most typically, however, like a refrigerator, the oven 10 will be maintained ready for use (i.e., preheated) at all times.

Exemplary of the rapid cooking times achievable with the present invention using a 110 volt power supply are 30 to 80 second cooks for single entree portions of frozen pre-cooked pizza, frozen raw chicken breast and raw steak, and 15 seconds cooks for pre-cooked frozen french fries and raw biscuits. On the other hand, refrigerated chicken breast or pizza may take 45 seconds. Thus, most refrigerated and frozen products of the type sold in a fast food restaurant can be cooked within 15 to 80 seconds, depending upon food product and volume, without any loss of quality to the standard quality level of the fast food industry.

As will be readily apparent to those skilled in the cooking art, the oven of the present invention not only provides for substantially reduced cook times as compared to traditional cooking means, but oftentimes substantially higher product quality than traditional cooking means. For example, much of the flavor and texture of vegetables can be lost if too much moisture is driven from them during the cooking process. The reduced cook times made possible through the oven of the present invention allow various food products (such as vegetables, chicken, sausage, etc.) to retain more flavor and moisture.

As illustrated, the energy sources (that is, the microwaves and the hot air) enter the cooking chamber 16 from opposite directions, with the air leaving the cooking chamber 16 from the same side (i.e., here, the bottom) as the microwaves are entering. As will be apparent to those skilled in the art, in other embodiments the energy sources may enter from the same direction or a perpendicular direction.

Operation of the oven according to the present invention is simple enough for use even by the relatively unskilled labor force employed in the typical fast food restaurant. The user opens the door 80, places a refrigerated or frozen food product 12 to be cooked on the platter 64, and closes the door 80. The user then indicates the type of food by pushing one of the buttons of keypad 204. The manufacturer or store manager has already set the oven for the desired time temperature profiles so now the user has only to press the START button switch to set into operation the entire procedure.

The magnetrons 100 and hot air blower 40 are then actuated according to the control means 250. The microwaves generated by the magnetrons 100 are directed into the rectangular waveguide legs of the angled waveguide 102, and thence into and through the ceramic heat seal 110 and into the circular waveguide 106, which has previously been adjusted at the factory to ensure that the microwaves discharged by the circular waveguide 106 are properly focused through the ceramic disk 64 onto the food product 12. The blower 40 blows the already preheated air of the plenum 18 through the hot air duct 52 and hot air diffuser apertures 54. The hot air forms jets as it passes through the hot air inlet plate apertures 56, which jets then strike the upper surface and the sides of the food product 12, and are pulled across the top of the food produce and downwardly toward the ceramic disk 64. The reflected hot air is intercepted first by the nose 61 and then by the ceramic disk 64 which guides the hot air radially inwardly along the bottom surface of the food product 12 until the hot air can pass out of the cooking chamber 16 through the central aperture 66 of the ceramic disk 64. The hot air entering the central aperture 66 is blocked from further passage towards the magnetrons 100 by the heat seal 110 and thus passes through the air holes 112 of metallic screen 82 and into the return air duct 120, thence returning via the filter 300 and blower 40 to the plenum 18 for reheating and recycling. Even where the diffuser apertures 54 do not directly expose the sides of food product 12 to the impingement air, the blower 40 causes the hot air reflected from the food product 12 and upper sidewall surface 60 to be drawn downwardly about the sides of the food product and then across the bottom surface thereof.

When the food product 12 is cooked, as determined by the end of the last to terminate cooking means (or alternatively by actuation of the STOP button by the user), the loading function is reversed.

It will be appreciated that at any time during the cook process or following completion thereof (but preferably once the magnetrons 100 and blower 40 are deactuated by the control means 250 after a cook), the thermostatic control of the control means 250 actuates the heating means, as necessary, to return the air within the plenum to the "set" temperature during or between cooks.

As will also be readily apparent to those skilled in the cooking art, the oven of the present invention may be utilized either for hybrid cooking utilizing both microwaves and hot-air impingement, for microwave cooking alone (simply by not actuating the blower 40), or for hot-air impingement cooking alone (simply by not actuating the magnetrons 100). When the oven is not intended for hybrid use, the portions not pertinent to its intended use may be eliminated to reduce manufacturing costs or, alternatively, may be retained to enable the oven to be switched at a later date to another mode of operation (either the other single function or the hybrid function). Of course in such an exclusively hot air oven, the various limitations and restrictions identified as arising out of the use of microwave cooking are not applicable. For example, instead of a ceramic platter 64 (made ceramic so as to enable the passage of microwaves therethrough), a non-ceramic platter may be used. Indeed, where the platter is made of metal or another material affording high heat transfer properties, a toasting effect may be obtained with the food upper surface being toasted, by the incoming air and the food bottom surface being toasted by the hot platter. Similarly, the metal screen may be made of a different material as it is no longer required to direct and reflect microwaves.

An extended cooking cycle will be required in a non-hybrid oven utilizing only hot-air impingement cooking where the food requires substantial internal heating (e.g., is frozen). However, a food product which requires more external cooking than internal cooking will not suffer as much from the elimination of microwave cooking. For example, where the food product has a large surface area-to-volume ratio—for example, frozen french fries—the rapidly moving heated air can produce a french fry having a crisp outside without microwaves in about 30 seconds (about twice as long as it would take if there were also microwave cooking). Thus, the non-hybrid oven is primarily, but not exclusively, useful with non-frozen foods, although particular frozen foods having a large surface area-to-volume ratio may be productively used in such an oven.

To summarize, the present invention provides a quick-cooking oven, such as a hybrid oven utilizing hot-air impingement and microwave cooking, in order to cook many single entree portion frozen or refrigerated food products within 30–80 or 15–50 seconds, respectively, or a non-hybrid oven which is generally capable of cooking most refrigerated food products within 20–60 seconds depending upon food product and volume, all cooked to a quality level equal to the typical fast food restaurants, one product after another. In a preferred embodiment, the oven is operable on a 110 volt power supply and is safe, simple, and economical to manufacture, use and maintain. The hybrid oven may also be used as a quick-cooking non-hybrid oven which cooks with hot-air impingement only, or a separate non-hybrid oven utilizing hot-air impingement cooking only may be provided.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. An oven for cooking a food product at least partially by hot gas flow, comprising:
   (A) a housing defining a cooking chamber adapted to receive a food product for cooking, a hot gas plenum configured and dimensioned to hold a volume of gas, and conduit means for providing gaseous communication therebetween;
   (B) associated with said cooking chamber, impingement-causing means for causing impingement of gas from said plenum onto the food product in said cooking chamber, and return means for causing return of at least a portion of the gas from said cooking chamber to said plenum;
   (C) associated with said plenum, a thermal energy source for heating gas disposed in said plenum
   (D) blower means for selectively and variably causing the flow of gas from said return means, through said plenum, and to said impingement-causing means and
   (E) control means for variably actuating said blower means.

2. The oven of claim 1 wherein said control means includes means for maintaining a substantially constant temperature of gas supplied from said plenum despite substantial periodic thermal transfers to gas passing through said plenum.

3. The oven of claim 1 wherein said thermal energy source comprises a thermal reservoir and actuatable heating means for maintaining said thermal reservoir at a high temperature.

4. The oven of claim 3 wherein said control means includes means for actuating said heating means in response to at least one factor selected from the group consisting of a drop in the temperature of said thermal reservoir, a drop in the temperature of said cooking chamber, a calculated thermal loss from said oven, and combinations thereof.

5. The oven of claim 3 wherein said control means includes means for calculating the thermal loss from said oven over a period of time from various factors including at least one factor selected from the group consisting of the thermal energy lost from said cooking chamber to ambient gas, the thermal energy lost from said cooking chamber to a food product cooked in said cooking chamber, the thermal energy generated by said heading means, and combinations thereof.

6. The oven of claim 1 wherein said control means actuates said blower at least periodically to maintain said cooking chamber at at least a predetermined minimum temperature between cooking cycles.

7. The oven of claim 1 wherein said control means includes means for blowing gas from said plenum through said impingement-causing means at a predetermined rate appropriate to a particular food product for cooking during an initial portion of a cooking cycle, and thereafter adjusting the predetermined rate to provide at various points in the cooking cycle respective appropriate temperature differentials between the temperature of the plenum and the temperature of the cooking chamber.

8. The oven of claim 1 for cooking a food product at least partially by microwave cooking, said oven additionally including means for generating microwave energy and directing the microwave energy to the food product in said cooking chamber, the gas from said plenum being discharged in a given direction from said impingement-causing means and the microwave energy from said microwave generating and directing means being transmitted in an opposite direction to the given direction.

9. The oven of claim 1 wherein said blower means selectively and variably provides the gaseous communication between said plenum and said cooking chamber in increments at least as low as 5% of a maximum flow rate.

10. The oven of claim 1 wherein said return means is disposed relative to the food product such that the gas undergoes generally horizontal flow underneath the food product.

11. The oven of claim 1 wherein said return means includes a filter box disposed intermediate the food product and said plenum, said filter box having a portion of enlarged cross section and a bottom surface therebelow cooler than the gas entering said box, whereby the gas is slowed and cooled to convert gas-borne grease into liquid form, the grease in liquid form being trapped by said filter box bottom surface.

12. The oven of claim 1 wherein the temperature of the gas in said plenum is substantially constant and the effective temperature of the gas seen by the food product in said cooking chamber varies depending on the speed of the gas impinging on the food product.

13. The oven of claim 1 wherein said impingement-causing means causes impingement of gas from said plenum onto first areas of a food product in said cooking chamber, and said return means enables the return of gas from the first areas to said plenum only by passage of the gas in heat-transfer relationships over at least a portion of the other areas of the food product.

14. An oven for cooking a food product at least partially by hot gas flow, comprising:
(A) a housing defining a cooking chamber adapted to receive a food product for cooking, a hot gas plenum configured and dimensioned to hold a volume of gas, and conduit means for providing gaseous communication therebetween;
(B) associated with said cooking chamber, impingement-causing means for causing impingement of gas from said plenum onto the food product in said cooking chamber, and return means for causing return of at least a portion of the gas from said cooking chamber to said plenum;
(C) associated with said plenum, a thermal reservoir and actuatable heating means for maintaining said thermal reservoir at a high temperature;
(D) blower means for causing the flow of gas from said return means, through said plenum, and to said impingement-causing means; and
(E) control means for independently actuating said heating means and said blower means, said control means including means for maintaining a substantially constant temperature of gas supplied from said plenum despite substantial periodic thermal transfers to gas passing through said plenum.

15. The oven of claim 14 wherein said thermal reservoir includes a large thermal mass of metal and a closed volume for maintaining said mass of metal therein in the liquid and solid phases, said actuatable heating means heats said thermal mass of metal, and said control means additionally including means for actuating said heating means to maintain at least a substantial proportion of said thermal mass of metal in the liquid phase.

16. The oven of claim 15 wherein said metal is selected from the group consisting of zinc and zinc alloys.

17. The oven of claim 15 wherein said large thermal mass of metal has a potential total heat of fusion which is at least sufficient to cook a given food product in said cooking chamber.

18. The oven of claim 15 wherein said large thermal mass of metal has a potential total heat of fusion which is at least sufficient to cook successively a plurality of food products in said cooking chamber.

19. The oven of claim 15 wherein said control means includes means for actuating said heating means in response to at least one factor selected from the group consisting of a drop in the temperature of said thermal mass, a drop in the temperature of the top surface of the food product in said cooking chamber, a calculated thermal loss from said oven, and combinations thereof.

20. An oven for cooking a food product at least partially by hot gas flow, comprising:
(A) a housing defining a cooking chamber adapted to receive a food product for cooking, a hot gas plenum configured and dimensioned to hold a volume of gas, and conduit means for providing gaseous communication therebetween;
(B) associated with said cooking chamber, impingement-causing means for causing impingement of gas from said plenum onto the food product in said cooking chamber, and return means for causing return of at least a portion of the gas from said cooking chamber to said plenum;
(C) associated with said plenum, a thermal reservoir and actuatable heating means for maintaining said thermal reservoir at a high temperature;
(D) blower means for causing the flow of gas from said return means, through said plenum, and to said impingement-causing means; and
(E) control means for independently actuating said heating means and said blower means, said control means including means for actuating said heating means in response to at least one factor selected from the group consisting of a drop in the temperature of said thermal reservoir, a drop in the temperature of the top surface of the food product in said cooking chamber, a calculated thermal loss from said oven, and combinations thereof.

21. The oven of claim 20 wherein said control means includes means for calculating the thermal loss from said oven over a period of time from various factors including at least one factor selected from the group consisting of the thermal energy lost from said cooking chamber to ambient gas, the thermal energy lost from said cooking chamber to a food product cooked in said cooking chamber, the thermal energy generated by said heating means, and combinations thereof.

22. The oven of claim 20 wherein said control means periodically actuates said blower to maintain said cooking chamber at at least a predetermined minimum temperature between cooking cycles.

23. An oven for cooking a food product at least partially by hot gas flow, comprising:
(A) a housing defining a cooking chamber adapted to receive a food product for cooking, a hot gas plenum configured and dimensioned to hold a volume of gas, and conduit means for providing gaseous communication therebetween;
(B) associated with said cooking chamber, impingement-causing means for causing impingement of gas from said plenum onto the food product in said cooking chamber, and return means for causing return of at least a portion of the gas from said cooking chamber to said plenum;
(C) associated with said plenum, a thermal energy source for heating gas disposed in said plenum;
(D) blower means for selectively and variably causing the flow of gas from said return means, through said plenum, and to said impingement-causing means; and
(E) control means for variably actuating said blower means, said control means including means for causing said blower means to blow gas from said plenum through said impingement-causing means at a predetermined flow rate appropriate to the particular food product for cooking during an initial portion of a cooking cycle, and thereafter adjusting the predetermined rate to provide at various points in the cooking cycle appropriate temperature differentials between the temperature of said plenum and the temperature of the top surface of the particular food product in said cooking chamber for the particular food product.

24. The oven of claim 23 wherein said control means includes a memory means for storing, for different types of food product, the appropriate temperature differentials between the plenum temperature and the temperature at the top surface of a food product of that type in said cooking chamber at various points in a cooking cycle.

25. The oven of claim 23 wherein said control means includes a memory means for storing, for different types of food product, the appropriate temperature at the top surface of a food product of that type in said cooking chamber at various points in a cooking cycle.

26. The oven of claim 23 wherein said control means additionally includes means for adjusting duration of the cooking cycle.

27. The oven of claim 23 wherein said control means additionally includes means for adjusting duration of the cooking cycle depending upon the temperature at the top surface of a particular food product in said cooking chamber.

28. An oven for cooking a food product at least partially by hot gas flow and at least partially by microwave cooking, comprising:
   (A) a housing defining a cooking chamber adapted to receive a food product for cooking, a hot gas plenum configured and dimensioned to hold a volume of gas, conduit means for providing gaseous communication therebetween, and means for generating microwave energy and directing the microwave energy to the food products in said cooking chamber;
   (B) associated with said cooking chamber, impingement-causing means for causing impingement of gas from said plenum onto the food product in said cooking chamber, and returns means for causing return of at least a portion of the gas from said cooking chamber to said plenum;
   (C) associated with said plenum, a thermal energy source for heating gas disposed in said plenum;
   (D) blower means for causing the flow of gas from said return means, through said plenum, and to said impingement-causing means; and
   (E) control means for independently actuating said thermal energy source, said microwave generating means, and said blower means;
   the gas from said plenum being discharged in a given direction from said impingement-causing means and the microwave energy from said microwave generating and directing means being discharged in the opposite direction to the given direction.

29. The oven of claim 28 wherein said impingement-causing means is disposed above the food product and causes downward impingement of gas from said plenum onto the food product in said cooking chamber, and said microwave generating and directing means is disposed below the food product and causes the microwave energy to be upwardly directed onto the food product in said cooking chamber.

30. An oven for cooking a food product at least partially by hot gas flow, comprising:
   (A) a housing defining a cooking chamber adapted to receive a food product for cooking, a hot gas plenum configured and dimensioned to hold a volume of gas, and conduit means for providing gaseous communication therebetween;
   (B) associated with said cooking chamber, impingement-causing means for causing impingement of gas from said plenum onto the food product in said cooking chamber, and return means for causing return of at least some of the gas from said cooking chamber to said plenum;
   (C) associated with said plenum, a thermal energy source for heating gas designed in said plenum;
   (D) blower means for causing the flow of gas from said return means, through said plenum, and to said impingement-causing means; and
   (E) control means for actuating said blower means;
   said return means including a filter box disposed intermediate the food product and said plenum, said filter box having a cross section greater than an upstream portion of said return means and a bottom surface cooler than the gas entering said filter box, whereby the gas is slowed and cooled to convert gasborne grease into liquid form, the grease in liquid form being trapped by said filter box bottom surface.

31. The oven of claim 30 additionally including a grease filter disposed intermediate said filter box bottom surface and said plenum, whereby any gasborne grease remaining in the gas leaving said filter box is removed by said filter.

32. An oven for cooking a food product at least partially by hot gas flow, comprising:
   (A) a housing defining a cooking chamber adapted to receive a food product for cooking and maintain the food product stationary during cooking, a hot gas plenum configured and dimensioned to hold a volume of gas, and conduit means for providing gaseous communication therebetween.
   (B) associated with said cooking chamber, impingement-causing means for causing impingement of gas from said plenum onto first areas of the stationary food product in said cooking chamber, said impingement-causing means being stationary during cooking, and return means for causing return of at least a portion of the gas from said cooking chamber to said plenum, said return means enabling the return of gas from the first areas to said plenum only by passage of the gas over and in heat-transfer relationship with at least a portion of the other areas of the food product;
   (C) associated with said plenum, a thermal energy source for heating gas disposed in said plenum; and
   (D) blower means for causing the flow of gas from said return means, through said plenum, and to said impingement-causing means.

33. The oven of claim 32 wherein both the first areas and the other areas are disposed on the top surface of the food product.

34. The oven of claim 33 wherein the gas as a whole passes over and in heat-transfer relationship with all of the top or surfaces of the food product.

35. The oven of claim 33 wherein said return means enables the return of gas from the first areas and the other areas only by passage of the gas across and in heat-transfer relationship with a substantial portion of the bottom surface of the food product.

36. The oven of claim 35 wherein said portion of the bottom surface is substantially a radius thereof.

37. The oven of claim 32 wherein said return means is disposed relative to the food product such that the gas undergoes generally horizontal flow underneath the food product.

38. The oven of claim 32 wherein said return means defines a central aperture therethrough and enables the return of gas from said cooking chamber to said plenum only via said central aperture.

39. The oven of claim 38 wherein said central aperture limits the flow rate of gas through said cooking chamber.

40. The oven of claim 32 wherein said return means defines means for spacing the food product thereabove and enables the return of gas from said cooking chamber to said plenum via said spacing.

41. The oven of claim 40 wherein said spacing limits the flow of gas through said cooking chamber.

* * * * *